United States Patent
Yang et al.

(10) Patent No.: US 12,115,768 B2
(45) Date of Patent: Oct. 15, 2024

(54) PREPREGS, CORES, COMPOSITES AND ARTICLES INCLUDING REPELLENT MATERIALS

(71) Applicant: HANWHA AZDEL, INC., Forest, VA (US)

(72) Inventors: Yankai Yang, Lynchburg, VA (US); Yu-Tsan Tseng, Lynchburg, VA (US); Erich Vorenkamp, Pinckney, MI (US); Mark O Mason, Covington, VA (US)

(73) Assignee: Hanwha Azdel, Inc., Forest, VA (US)

( * ) Notice: Subject to any disclaimer, the term of this patent is extended or adjusted under 35 U.S.C. 154(b) by 0 days.

(21) Appl. No.: 16/869,023

(22) Filed: May 7, 2020

(65) Prior Publication Data

US 2021/0114333 A1     Apr. 22, 2021

Related U.S. Application Data

(63) Continuation of application No. 14/482,525, filed on Sep. 10, 2014, now abandoned.
(Continued)

(51) Int. Cl.
*B32B 7/12* (2006.01)
*B29C 70/68* (2006.01)
(Continued)

(52) U.S. Cl.
CPC ............ *B32B 5/022* (2013.01); *B29C 70/683* (2013.01); *B32B 5/024* (2013.01); *B32B 5/028* (2013.01); *B32B 7/12* (2013.01); *B32B 27/08* (2013.01); *B32B 27/12* (2013.01); *B32B 27/18* (2013.01); *B32B 27/32* (2013.01); *C09J 5/02* (2013.01);
(Continued)

(58) Field of Classification Search
CPC ............ D06M 13/213; D06M 13/408; D06M 2200/05; D06M 2200/10; D06M 2200/12; Y10T 442/2164–2254; D06N 3/0059; D06N 2211/06; C09J 5/02; B29C 70/683; B32B 2305/076; B32B 2262/101; B32B 2607/00; E04C 2/28; E04C 2/043
See application file for complete search history.

(56) References Cited

U.S. PATENT DOCUMENTS

2004/0075074 A1 * 4/2004 Kubota ............... D06M 15/277
                                                                 524/545
2004/0142618 A1 * 7/2004 Porter .................... D03D 15/00
                                                                 428/210

(Continued)

FOREIGN PATENT DOCUMENTS

JP              5306517 B1 *  10/2013

OTHER PUBLICATIONS

Espacenet translation of JP-5306517-B1 (Year: 2013).*
(Continued)

*Primary Examiner* — Jeremy R Pierce
*Assistant Examiner* — Christine X Nisula
(74) *Attorney, Agent, or Firm* — Rhodes IP PLC; Christopher R Rhodes

(57) ABSTRACT

Prepregs, cores and composite articles are described that comprise lighter weight materials and/or lower amounts of adhesive than commonly used. In some instances, one or more components of the articles may comprise a repellent material or repellent treatment to reduce the overall absorption rate of adhesive into the components of the article.

17 Claims, 17 Drawing Sheets

Related U.S. Application Data

(60) Provisional application No. 61/879,066, filed on Sep. 17, 2013.

(51) Int. Cl.
    *B32B 5/02*     (2006.01)
    *B32B 27/08*     (2006.01)
    *B32B 27/12*     (2006.01)
    *B32B 27/18*     (2006.01)
    *B32B 27/32*     (2006.01)
    *C09J 5/02*     (2006.01)
    *D06M 11/30*     (2006.01)
    *D06M 17/10*     (2006.01)
    *E04D 12/00*     (2006.01)
    *D06M 101/36*     (2006.01)

(52) U.S. Cl.
    CPC ............ *D06M 11/30* (2013.01); *D06M 17/10* (2013.01); *E04D 12/00* (2013.01); *B32B 2255/10* (2013.01); *B32B 2255/26* (2013.01); *B32B 2262/0269* (2013.01); *B32B 2262/0284* (2013.01); *B32B 2262/101* (2013.01); *B32B 2262/103* (2013.01); *B32B 2262/105* (2013.01); *B32B 2262/106* (2013.01); *B32B 2307/7145* (2013.01); *B32B 2307/7265* (2013.01); *B32B 2607/00* (2013.01); *D06M 2101/36* (2013.01); *D06M 2200/10* (2013.01); *Y10T 428/249982* (2015.04); *Y10T 428/249985* (2015.04); *Y10T 428/249986* (2015.04); *Y10T 442/10* (2015.04); *Y10T 442/3325* (2015.04); *Y10T 442/647* (2015.04)

(56) References Cited

U.S. PATENT DOCUMENTS

| | | | | |
|---|---|---|---|---|
| 2005/0217932 | A1* | 10/2005 | Woodman | B60R 13/0815 |
| | | | | 181/290 |
| 2008/0121461 | A1* | 5/2008 | Gross | D06M 11/82 |
| | | | | 442/334 |
| 2012/0286189 | A1* | 11/2012 | Barthel | C04B 28/26 |
| | | | | 252/62 |
| 2013/0171900 | A1* | 7/2013 | Bauer | B32B 5/16 |
| | | | | 428/688 |

OTHER PUBLICATIONS

Soutsos, Marios Domone, peter (2018). Construction Materials—Their Nature and Behaviour (5th Edition)—6.2 Wetting. Taylor & Francis. Retrieved from https://app.knovel.com/hotlink/pdf/id:kt00CX47Q7/construction-materials/wetting (Year: 2018).*

* cited by examiner

PREPREGS, CORES, COMPOSITES AND ARTICLES INCLUDING REPELLENT MATERIALS

PRIORITY APPLICATION

This application claims priority to, and the benefit of, U.S. Provisional Application No. 61/879,066 filed on Sep. 17, 2013, the entire disclosure of which is hereby incorporated herein by reference.

TECHNOLOGICAL FIELD

This application is related to prepregs, composites and articles that can be produced using one or more repellent materials to permit the use of lesser amounts of adhesive, lighter weight materials or provide other desirable attributes.

BACKGROUND

Porous fiber-reinforced thermoplastic composite sheets are described in U.S. Pat. Nos. 7,244,501 and 7,628,697.

SUMMARY

In one aspect, a prepreg comprising a thermoplastic material and a plurality of reinforcing materials dispersed in the thermoplastic material to provide an open cell structure is described. In certain configurations, the prepreg further comprises a repellent treatment on at least one surface of the prepreg, the repellent treatment effective to decrease absorption of a fluid into the open cell structure of the prepreg, e.g., fluid absorption is less or slower as compared to a comparable surface with no repellent treatment.

In certain instances, the reinforcing materials comprise reinforcing fibers. In other instances, the reinforcing fibers are present from about 20 weight percent to about 80 weight percent based on the weight of the prepreg. In some embodiments, the reinforcing fibers comprise metal fibers, metalized inorganic fibers, metallized synthetic fibers, glass fibers, carbon fibers, aramid fibers, ceramic fibers and combinations thereof. In other embodiments, the prepreg may further comprise an adhesive layer disposed on the at least one surface comprising the repellent treatment. In some configurations, the adhesive layer comprises a polyolefin adhesive, an ethylene-vinyl acetate adhesive, a polyamide adhesive, a polyester adhesive, a polyurethane adhesive, a thermoplastic polyurethane adhesive, a styrene block copolymer adhesive, a polycarbonate adhesive, a fluoropolymeric adhesive, a silicone adhesive, a silicone rubber adhesive, an elastomeric adhesive, or a pyrrole adhesive. In other instances, the prepreg further comprises a substrate disposed on the adhesive layer. In some instances, the repellent material is effective to render the adhesive temperature insensitive. In other instances, the thermoplastic material of the prepreg comprises polyethylene, polypropylene, polystyrene, acrylonitrylstyrene, butadiene, polyethyleneterephthalate, polybutyleneterephthalate, polybutylenetetrachlorate, polyvinyl chloride, polyphenylene ether, polycarbonates, polyestercarbonates, thermoplastic polyesters, polyimides, polyamides, polyetherimides, acrylonitrile-butylacrylate-styrene polymers, amorphous nylon, polyarylene ether ketone, polyphenylene sulfide, polyaryl sulfone, polyether sulfone, poly(1,4phenylene) compounds, silicones and combinations thereof. In some embodiments, the prepreg may comprise a flame retardant. In some configurations, some portion of a surface of the prepreg comprises a repellency grade number of at least 3 as tested by ISO 23232 dated 2009.

In another aspect, a prepreg comprising a thermoplastic material and a plurality of repellent treated reinforcing materials dispersed in the thermoplastic material to provide an open cell structure is disclosed. In certain instances, the repellent treated reinforcing materials are effective to decrease absorption of a fluid into the open cell structure of the prepreg.

In certain embodiments, the reinforcing materials comprise reinforcing fibers. In other embodiments, the reinforcing fibers are present from about 20 weight percent to about 80 weight percent based on the weight of the prepreg. In further instances, the reinforcing fibers comprise metal fibers, metalized inorganic fibers, metallized synthetic fibers, glass fibers, carbon fibers, aramid fibers, ceramic fibers and combinations thereof. In some embodiments, the prepreg comprises an adhesive layer disposed on the at least one surface comprising the repellent treated reinforcing materials. In certain examples, the adhesive layer comprises a polyolefin adhesive, an ethylene-vinyl acetate adhesive, a polyamide adhesive, a polyester adhesive, a polyurethane adhesive, a thermoplastic polyurethane adhesive, a styrene block copolymer adhesive, a polycarbonate adhesive, a fluoropolymeric adhesive, a silicone adhesive, a silicone rubber adhesive, an elastomeric adhesive, or a pyrrole adhesive. In further examples, the prepreg may comprise a substrate disposed on the adhesive layer. In some embodiments, the repellent treated reinforcing materials are effective to render the adhesive temperature and/or viscosity insensitive. In other embodiments, the thermoplastic material of the prepreg comprises polyethylene, polypropylene, polystyrene, acrylonitrylstyrene, butadiene, polyethyleneterephthalate, polybutyleneterephthalate, polybutylenetetrachlorate, polyvinyl chloride, polyphenylene ether, polycarbonates, polyestercarbonates, thermoplastic polyesters, polyimides, polyamides, polyetherimides, acrylonitrile-butylacrylate-styrene polymers, amorphous nylon, polyarylene ether ketone, polyphenylene sulfide, polyaryl sulfone, polyether sulfone, poly(1,4phenylene) compounds, silicones and combinations thereof. In certain configurations, the prepreg may comprise a flame retardant. In some instances, some portion of a surface of the prepreg comprises a repellency grade number of at least 3 as tested by ISO 23232 dated 2009.

In another aspect, a core comprising a web of open celled structures defined by random crossing over of reinforcing materials held together by a thermoplastic material, the core comprising a repellent treatment on a surface of the core, in which the repellent treatment is effective to decrease absorption of a fluid into voids of the core is provided.

In certain embodiments, the reinforcing materials comprise reinforcing fibers. In other embodiments, the reinforcing fibers are present from about 20 weight percent to about 80 weight percent based on the weight of the core. In some instances, the reinforcing fibers comprise metal fibers, metalized inorganic fibers, metallized synthetic fibers, glass fibers, carbon fibers, aramid fibers, ceramic fibers and combinations thereof. In further examples, the core may comprise an adhesive layer disposed on the at least one surface comprising the repellent treatment. In some embodiments, the adhesive layer comprises a polyolefin adhesive, an ethylene-vinyl acetate adhesive, a polyamide adhesive, a polyester adhesive, a polyurethane adhesive, a thermoplastic polyurethane adhesive, a styrene block copolymer adhesive, a polycarbonate adhesive, a fluoropolymeric adhesive, a silicone adhesive, a silicone rubber adhesive, an elastomeric adhesive, or a pyrrole adhesive. In some instances, the core may comprise a substrate disposed on the adhesive layer. In further examples, the repellent material is effective to render the adhesive temperature insensitive. In certain instances, the thermoplastic material of the core comprises polyethylene, polypropylene, polystyrene, acrylonitrylstyrene, butadiene, polyethyleneterephthalate, polybutyleneterephthalate, polybutylenetetrachlorate, polyvinyl chloride, polyphenylene ether, polycarbonates, polyestercarbonates, thermoplastic polyesters, polyimides, polyamides, polyetherimides, acrylonitrile-butylacrylate-styrene polymers, amorphous nylon, polyarylene ether ketone, polyphenylene sulfide, polyaryl sulfone, polyether sulfone, poly(1,4phenylene) compounds, silicones and combinations thereof. In further embodiments, the core may comprise a flame retardant. In some instances, some portion of a surface of the core comprises a repellency grade number of at least 3 as tested by ISO 23232 dated 2009.

In another aspect, a core comprising a web of open celled structures defined by random crossing over of a plurality of repellent treated reinforcing materials held together by a thermoplastic material, in which the repellent treated reinforcing materials are effective to decrease absorption of a fluid into voids of the core is described.

In certain examples, the reinforcing materials comprise reinforcing fibers. In other examples, the reinforcing fibers are present from about 20 weight percent to about 80 weight percent based on the weight of the core. In some embodiments, the reinforcing fibers comprise metal fibers, metalized inorganic fibers, metallized synthetic fibers, glass fibers, carbon fibers, aramid fibers, ceramic fibers and combinations thereof. In certain instances, the core may comprise an adhesive layer disposed on the at least one surface comprising the repellent treated reinforcing materials. In some instances, the adhesive layer comprises a polyolefin adhesive, an ethylene-vinyl acetate adhesive, a polyamide adhesive, a polyester adhesive, a polyurethane adhesive, a thermoplastic polyurethane adhesive, a styrene block copolymer adhesive, a polycarbonate adhesive, a fluoropolymeric adhesive, a silicone adhesive, a silicone rubber adhesive, an elastomeric adhesive, or a pyrrole adhesive. In certain configurations, a substrate can be disposed on the adhesive layer of the core. In some embodiments, the repellent material is effective to render the adhesive temperature and/or viscosity insensitive. In other embodiments, the thermoplastic material of the core comprises polyethylene, polypropylene, polystyrene, acrylonitrylstyrene, butadiene, polyethyleneterephthalate, polybutyleneterephthalate, polybutylenetetrachlorate, polyvinyl chloride, polyphenylene ether, polycarbonates, polyestercarbonates, thermoplastic polyesters, polyimides, polyamides, polyetherimides, acrylonitrile-butylacrylate-styrene polymers, amorphous nylon, polyarylene ether ketone, polyphenylene sulfide, polyaryl sulfone, polyether sulfone, poly(1,4phenylene) compounds, silicones and combinations thereof. In certain examples, the core may comprise a flame retardant. In further examples, some portion of a surface of the core comprises a repellency grade number of at least 3 as tested by ISO 23232 dated 2009.

In an additional aspect, a composite article comprising a prepreg comprising a thermoplastic material and a plurality of reinforcing materials dispersed in the thermoplastic material to provide an open cell structure, the prepreg further comprising a repellent treatment on at least one surface of the prepreg, the repellent treatment effective to decrease absorption of a fluid into the open cell structure of the prepreg, and a substrate disposed on the prepreg is provided.

In certain embodiments, the reinforcing materials comprise reinforcing fibers. In other embodiments, the reinforcing fibers are present from about 20 weight percent to about 80 weight percent based on the weight of the prepreg. In further examples, the reinforcing fibers comprise metal fibers, metalized inorganic fibers, metallized synthetic fibers, glass fibers, carbon fibers, aramid fibers, ceramic fibers and combinations thereof. In some instances, the article may comprise an adhesive layer disposed on the at least one surface comprising the repellent treatment. In certain instances, the adhesive layer comprises a polyolefin adhesive, an ethylene-vinyl acetate adhesive, a polyamide adhesive, a polyester adhesive, a polyurethane adhesive, a thermoplastic polyurethane adhesive, a styrene block copolymer adhesive, a polycarbonate adhesive, a fluoropolymeric adhesive, a silicone adhesive, a silicone rubber adhesive, an elastomeric adhesive, or a pyrrole adhesive. In some configurations, the substrate comprises a film, a frim, a scrim, a foil, a woven fabric or a non-woven fabric. In other examples, the repellent material is effective to render the adhesive temperature insensitive. In some embodiments, the thermoplastic material comprises polyethylene, polypropylene, polystyrene, acrylonitrylstyrene, butadiene, polyethyleneterephthalate, polybutyleneterephthalate, polybutylenetetrachlorate, polyvinyl chloride, polyphenylene ether, polycarbonates, polyestercarbonates, thermoplastic polyesters, polyimides, polyamides, polyetherimides, acrylonitrile-butylacrylate-styrene polymers, amorphous nylon, polyarylene ether ketone, polyphenylene sulfide, polyaryl sulfone, polyether sulfone, poly(1,4phenylene) compounds, silicones and combinations thereof. In some examples, the article may comprise a flame retardant in the prepreg or the substrate or both. In further examples, some portion of a surface of the article, e.g., a surface of the prepreg, comprises a repellency grade number of at least 3 as tested by ISO 23232 dated 2009.

In another aspect, a composite article comprising a prepreg comprising a thermoplastic material and a plurality of reinforcing materials dispersed in the thermoplastic material to provide an open cell structure is provided. In some instances, the composite article may also comprise a substrate disposed on the prepreg, the substrate comprising a repellent treatment on at least one surface of the substrate, the repellent treatment effective to decrease absorption of a fluid into the substrate, e.g., fluid absorption is less or slower as compared to a comparable surface with no repellent treatment.

In certain examples, the reinforcing materials comprise reinforcing fibers. In some embodiments, the reinforcing fibers are present from about 20 weight percent to about 80 weight percent based on the weight of the prepreg. In other embodiments, the reinforcing fibers comprise metal fibers, metalized inorganic fibers, metallized synthetic fibers, glass fibers, carbon fibers, aramid fibers, ceramic fibers and combinations thereof. In certain instances, the article may also comprise an adhesive layer disposed on the at least one surface comprising the repellent treatment. In some embodiments, the adhesive layer comprises a polyolefin adhesive, an ethylene-vinyl acetate adhesive, a polyamide adhesive, a polyester adhesive, a polyurethane adhesive, a thermoplastic polyurethane adhesive, a styrene block copolymer adhesive, a polycarbonate adhesive, a fluoropolymeric adhesive, a silicone adhesive, a silicone rubber adhesive, an elastomeric adhesive, or a pyrrole adhesive. In other instances, the substrate comprises a film, a frim, a scrim, a foil, a woven fabric or a non-woven fabric. In further embodiments, the repellent material is effective to render the adhesive temperature and/or viscosity insensitive. In additional examples, the thermoplastic material of the prepreg comprises polyethylene, polypropylene, polystyrene, acrylonitrylstyrene, butadiene, polyethyleneterephthalate, polybutyleneterephthalate, polybutylenetetrachlorate, polyvinyl chloride, polyphenylene ether, polycarbonates, polyestercarbonates, thermoplastic polyesters, polyimides, polyamides, polyetherimides, acrylonitrile-butylacrylate-styrene polymers, amorphous nylon, polyarylene ether ketone, polyphenylene sulfide, polyaryl sulfone, polyether sulfone, poly(1,4phenylene) compounds, silicones and combinations thereof. In some embodiments, the article comprises a flame retardant in the prepreg or the substrate or both. In certain examples, some portion of a surface of the article, e.g., a surface of the prepreg, comprises a repellency grade number of at least 3 as tested by ISO 23232 dated 2009.

In an additional aspect, a composite article comprising a prepreg comprising a thermoplastic material and a plurality of repellent treated reinforcing materials dispersed in the thermoplastic material to provide an open cell structure, the repellent treated reinforcing materials effective to decrease absorption of a fluid into the open cell structure of the prepreg is provided. In certain instances, the article may also comprise a substrate disposed on the prepreg.

In certain embodiments, the reinforcing materials comprise reinforcing fibers. In other embodiments, the reinforcing fibers are present from about 20 weight percent to about 80 weight percent based on the weight of the prepreg. In additional examples, the reinforcing fibers comprise metal fibers, metalized inorganic fibers, metallized synthetic fibers, glass fibers, carbon fibers, aramid fibers, ceramic fibers and combinations thereof. In other examples, the article may comprise an adhesive layer disposed on the at least one surface comprising the repellent treated reinforcing materials. In some instances, the adhesive layer comprises a polyolefin adhesive, an ethylene-vinyl acetate adhesive, a polyamide adhesive, a polyester adhesive, a polyurethane adhesive, a thermoplastic polyurethane adhesive, a styrene block copolymer adhesive, a polycarbonate adhesive, a fluoropolymeric adhesive, a silicone adhesive, a silicone rubber adhesive, an elastomeric adhesive, or a pyrrole adhesive. In certain examples, the substrate comprises a film, a frim, a scrim, a foil, a woven fabric or a non-woven fabric. In further embodiments, the repellent material is effective to render the adhesive temperature and/or viscosity insensitive. In some examples, the thermoplastic material of the prepreg comprises polyethylene, polypropylene, polystyrene, acrylonitrylstyrene, butadiene, polyethyleneterephthalate, polybutyleneterephthalate, polybutylenetetrachlorate, polyvinyl chloride, polyphenylene ether, polycarbonates, polyestercarbonates, thermoplastic polyesters, polyimides, polyamides, polyetherimides, acrylonitrile-butylacrylate-styrene polymers, amorphous nylon, polyarylene ether ketone, polyphenylene sulfide, polyaryl sulfone, polyether sulfone, poly(1,4phenylene) compounds, silicones and combinations thereof. In other embodiments, the article may comprise a flame retardant in the prepreg or the substrate or both. In certain examples, some portion of a surface of the article, e.g., a surface of the prepreg, comprises a repellency grade number of at least 3 as tested by ISO 23232 dated 2009.

In another aspect, a composite article comprising a prepreg comprising a thermoplastic material and a plurality of repellent treated reinforcing materials dispersed in the thermoplastic material to provide an open cell structure, the repellent treated reinforcing materials effective to decrease absorption of a fluid into the open cell structure of the prepreg is provided. In certain instances, the article may also comprise a substrate disposed on the prepreg, the substrate comprising a repellent treatment on at least one surface of the substrate, the repellent treatment effective to decrease absorption of a fluid into the substrate.

In some examples, the reinforcing materials comprise reinforcing fibers. In other examples, the reinforcing fibers are present from about 20 weight percent to about 80 weight percent based on the weight of the prepreg. In certain embodiments, the reinforcing fibers comprise metal fibers, metalized inorganic fibers, metallized synthetic fibers, glass fibers, carbon fibers, aramid fibers, ceramic fibers and combinations thereof. In some examples, the article may comprise an adhesive layer disposed on the at least one surface comprising the repellent treated reinforcing materials or on at least one repellent treated surface of the substrate or both. In certain embodiments, the adhesive layer comprises a polyolefin adhesive, an ethylene-vinyl acetate adhesive, a polyamide adhesive, a polyester adhesive, a polyurethane adhesive, a thermoplastic polyurethane adhesive, a styrene block copolymer adhesive, a polycarbonate adhesive, a fluoropolymeric adhesive, a silicone adhesive, a silicone rubber adhesive, an elastomeric adhesive, or a pyrrole adhesive. In other instances, the substrate comprises a film, a frim, a scrim, a foil, a woven fabric or a non-woven fabric. In further examples, the repellent material is effective to render the adhesive temperature and/or viscosity insensitive. In additional embodiments, the thermoplastic material of the prepreg comprises polyethylene, polypropylene, polystyrene, acrylonitrylstyrene, butadiene, polyethyleneterephthalate, polybutyleneterephthalate, polybutylenetetrachlorate, polyvinyl chloride, polyphenylene ether, polycarbonates, polyestercarbonates, thermoplastic polyesters, polyimides, polyamides, polyetherimides, acrylonitrile-butylacrylate-styrene polymers, amorphous nylon, polyarylene ether ketone, polyphenylene sulfide, polyaryl sulfone, polyether sulfone, poly(1,4phenylene) compounds, silicones and combinations thereof. In some examples, the article comprises a flame retardant in the prepreg or the substrate or both.

In certain examples, some portion of a surface of the article, e.g., a surface of the prepreg, comprises a repellency grade number of at least 3 as tested by ISO 23232 dated 2009.

In an additional aspect, a composite article comprising a core comprising a web of open celled structures defined by random crossing over of reinforcing materials held together by a thermoplastic material, the core comprising a repellent treatment on a surface of the core, in which the repellent treatment is effective to decrease absorption of a fluid into voids of the core is provided. In other examples, the article may also comprise a substrate disposed on the core.

In certain examples, the reinforcing materials comprise reinforcing fibers. In other examples, the reinforcing fibers are present from about 20 weight percent to about 80 weight percent based on the weight of the core. In some embodiments, the reinforcing fibers comprise metal fibers, metalized inorganic fibers, metallized synthetic fibers, glass fibers, carbon fibers, aramid fibers, ceramic fibers and combinations thereof. In further examples, the article may comprise an adhesive layer disposed on the at least one surface comprising the repellent treatment. In other instances, the adhesive layer comprises a polyolefin adhesive, an ethylene-vinyl acetate adhesive, a polyamide adhesive, a polyester adhesive, a polyurethane adhesive, a thermoplastic polyurethane adhesive, a styrene block copolymer adhesive, a polycarbonate adhesive, a fluoropolymeric adhesive, a silicone adhesive, a silicone rubber adhesive, an elastomeric adhesive, or a pyrrole adhesive. In further examples, the substrate comprises a film, a frim, a scrim, a foil, a woven fabric or a non-woven fabric. In some embodiments, the repellent material is effective to render the adhesive temperature and/or viscosity insensitive. In some examples, the thermoplastic material of the core comprises polyethylene, polypropylene, polystyrene, acrylonitrylstyrene, butadiene, polyethyleneterephthalate, polybutyleneterephthalate, polybutylenetetrachlorate, polyvinyl chloride, polyphenylene ether, polycarbonates, polyestercarbonates, thermoplastic polyesters, polyimides, polyamides, polyetherimides, acrylonitrile-butylacrylate-styrene polymers, amorphous nylon, polyarylene ether ketone, polyphenylene sulfide, polyaryl sulfone, polyether sulfone, poly(1,4phenylene) compounds, silicones and combinations thereof. In certain embodiments, the article may comprise a flame retardant in the core or the substrate or both. In certain examples, some portion of a surface of the article, e.g., a surface of the core, comprises a repellency grade number of at least 3 as tested by ISO 23232 dated 2009.

In another aspect, a composite article comprising a core comprising a web of open celled structures defined by random crossing over of reinforcing materials held together by a thermoplastic material, and a substrate disposed on the core, the substrate comprising a repellent treatment on at least one surface of the substrate, and the repellent treatment effective to decrease absorption of a fluid into the substrate is described.

In certain examples, the reinforcing materials comprise reinforcing fibers. In some embodiments, the reinforcing fibers are present from about 20 weight percent to about 80 weight percent based on the weight of the core. In further examples, the reinforcing fibers comprise metal fibers, metalized inorganic fibers, metallized synthetic fibers, glass fibers, carbon fibers, aramid fibers, ceramic fibers and combinations thereof. In additional examples, the article may comprise an adhesive layer disposed on the at least one surface comprising the repellent treatment. In some embodiments, the adhesive layer comprises a polyolefin adhesive, an ethylene-vinyl acetate adhesive, a polyamide adhesive, a polyester adhesive, a polyurethane adhesive, a thermoplastic polyurethane adhesive, a styrene block copolymer adhesive, a polycarbonate adhesive, a fluoropolymeric adhesive, a silicone adhesive, a silicone rubber adhesive, an elastomeric adhesive, or a pyrrole adhesive. In further examples, the substrate comprises a film, a frim, a scrim, a foil, a woven fabric or a non-woven fabric. In some instances, the repellent material is effective to render the adhesive temperature and/or viscosity insensitive. In further embodiments, the thermoplastic material of the core comprises polyethylene, polypropylene, polystyrene, acrylonitrylstyrene, butadiene, polyethyleneterephthalate, polybutyleneterephthalate, polybutylenetetrachlorate, polyvinyl chloride, polyphenylene ether, polycarbonates, polyestercarbonates, thermoplastic polyesters, polyimides, polyamides, polyetherimides, acrylonitrile-butylacrylate-styrene polymers, amorphous nylon, polyarylene ether ketone, polyphenylene sulfide, polyaryl sulfone, polyether sulfone, poly(1,4phenylene) compounds, silicones and combinations thereof. In some examples, the article may comprise a flame retardant in the core or the substrate or both. In certain examples, some portion of a surface of the article, e.g., a surface of the core, comprises a repellency grade number of at least 3 as tested by ISO 23232 dated 2009.

In an additional aspect, a composite article comprising a core comprising a web of open celled structures defined by random crossing over of a plurality of repellent treated reinforcing materials held together by a thermoplastic material, in which the repellent treated reinforcing materials are effective to decrease absorption of a fluid into voids of the core is provided. In certain instances, the article may also comprise a substrate disposed on the core.

In certain embodiments, the reinforcing materials comprise reinforcing fibers. In certain examples, the reinforcing fibers are present from about 20 weight percent to about 80 weight percent based on the weight of the core. In some examples, the reinforcing fibers comprise metal fibers, metalized inorganic fibers, metallized synthetic fibers, glass fibers, carbon fibers, aramid fibers, ceramic fibers and combinations thereof. In other instances, the article may comprise an adhesive layer disposed on the at least one surface comprising the repellent treated reinforcing materials. In further embodiments, the adhesive layer comprises a polyolefin adhesive, an ethylene-vinyl acetate adhesive, a polyamide adhesive, a polyester adhesive, a polyurethane adhesive, a thermoplastic polyurethane adhesive, a styrene block copolymer adhesive, a polycarbonate adhesive, a fluoropolymeric adhesive, a silicone adhesive, a silicone rubber adhesive, an elastomeric adhesive, or a pyrrole adhesive. In some examples, the substrate comprises a film, a frim, a scrim, a foil, a woven fabric or a non-woven fabric. In certain embodiments, the repellent material is effective to render the adhesive temperature and/or viscosity insensitive. In other embodiments, the thermoplastic material of the core comprises polyethylene, polypropylene, polystyrene, acrylonitrylstyrene, butadiene, polyethyleneterephthalate, polybutyleneterephthalate, polybutylenetetrachlorate, polyvinyl chloride, polyphenylene ether, polycarbonates, polyestercarbonates, thermoplastic polyesters, polyimides, polyamides, polyetherimides, acrylonitrile-butylacrylate-styrene polymers, amorphous nylon, polyarylene ether ketone, polyphenylene sulfide, polyaryl sulfone, polyether sulfone, poly(1,4phenylene) compounds, silicones and combinations thereof. In some examples, the article may comprise a flame retardant in the core or the substrate or both. In certain examples, some portion of a surface of the article, e.g., a surface of the core, comprises a repellency grade number of at least 3 as tested by ISO 23232 dated 2009.

In another aspect, a composite article comprising a core comprising a web of open celled structures defined by random crossing over of a plurality of repellent treated reinforcing materials held together by a thermoplastic material, in which the repellent treated reinforcing materials are effective to decrease absorption of a fluid into voids of the core, in which the article also comprises a substrate disposed on the core, the substrate comprising a repellent treatment on at least one surface of the substrate, the repellent treatment effective to decrease absorption of a fluid into the substrate is disclosed.

In certain embodiments, the reinforcing materials comprise reinforcing fibers. In other embodiments, the reinforcing fibers are present from about 20 weight percent to about 80 weight percent based on the weight of the core. In some instances, the reinforcing fibers comprise metal fibers, metalized inorganic fibers, metallized synthetic fibers, glass fibers, carbon fibers, aramid fibers, ceramic fibers and combinations thereof. In further examples, the article may also comprise an adhesive layer disposed on the at least one surface comprising the repellent treated reinforcing materials or on at least one repellent treated surface of the substrate or both. In some embodiments, the adhesive layer comprises a polyolefin adhesive, an ethylene-vinyl acetate adhesive, a polyamide adhesive, a polyester adhesive, a polyurethane adhesive, a thermoplastic polyurethane adhesive, a styrene block copolymer adhesive, a polycarbonate adhesive, a fluoropolymeric adhesive, a silicone adhesive, a silicone rubber adhesive, an elastomeric adhesive, or a pyrrole adhesive. In certain instances, the substrate comprises a film, a frim, a scrim, a foil, a woven fabric or a non-woven fabric. In other instances, the repellent material is effective to render the adhesive temperature and/or viscosity insensitive. In further examples, the thermoplastic material of the core comprises polyethylene, polypropylene, polystyrene, acrylonitrylstyrene, butadiene, polyethyleneterephthalate, polybutyleneterephthalate, polybutylenetetrachlorate, polyvinyl chloride, polyphenylene ether, polycarbonates, polyestercarbonates, thermoplastic polyesters, polyimides, polyamides, polyetherimides, acrylonitrile-butylacrylate-styrene polymers, amorphous nylon, polyarylene ether ketone, polyphenylene sulfide, polyaryl sulfone, polyether sulfone, poly(1,4phenylene) compounds, silicones and combinations thereof. In some embodiments, the article comprises a flame retardant in the core or the substrate or both. In certain examples, some portion of a surface of the article, e.g., a surface of the core, comprises a repellency grade number of at least 3 as tested by ISO 23232 dated 2009.

In an additional aspect, a kit comprising a prepreg or core comprising a thermoplastic material and a plurality of reinforcing materials dispersed in the thermoplastic material to provide an open cell structure, a repellent material effective to decrease absorption of a fluid, e.g., a liquid, adhesive, water or other fluid, into the open cell structure of the prepreg or the core, and instructions for disposing the repellent material on the prepreg or the core is described.

In certain embodiments, the kit may also comprise a substrate. In other embodiments, the substrate comprises a film, a frim, a scrim, a foil, a woven fabric or a non-woven fabric. In certain examples, the kit may also comprise an adhesive. In other embodiments, the adhesive is a polyolefin adhesive, an ethylene-vinyl acetate adhesive, a polyamide adhesive, a polyester adhesive, a polyurethane adhesive, a thermoplastic polyurethane adhesive, a styrene block copolymer adhesive, a polycarbonate adhesive, a fluoropolymeric adhesive, a silicone adhesive, a silicone rubber adhesive, an elastomeric adhesive, or a pyrrole adhesive. In some instances, the prepreg or the core of the kit may comprise at least one surface (or portion thereof) that comprises a repellency grade number of at least 3 as tested by ISO 23232 dated 2009.

In another aspect, a kit comprising a prepreg or core comprising a thermoplastic material and a plurality of reinforcing materials dispersed in the thermoplastic material to provide an open cell structure, the prepreg or the core further comprising a repellent treatment on at least one surface of the prepreg or the core, the repellent treatment effective to decrease absorption of a fluid, e.g., a liquid, adhesive, water or other fluid, into the open cell structure of the prepreg or the core, aa substrate in the kit, and instructions for using the substrate with the prepreg or the core to provide an article is described.

In certain examples, the kit comprises a repellent material to treat the substrate. In other examples, the substrate comprises a film, a frim, a scrim, a foil, a woven fabric or a non-woven fabric. In some embodiments, the kit further comprises an adhesive. In other instances, the adhesive is a polyolefin adhesive, an ethylene-vinyl acetate adhesive, a polyamide adhesive, a polyester adhesive, a polyurethane adhesive, a thermoplastic polyurethane adhesive, a styrene block copolymer adhesive, a polycarbonate adhesive, a fluoropolymeric adhesive, a silicone adhesive, a silicone rubber adhesive, an elastomeric adhesive, or a pyrrole adhesive. In some instances, the prepreg or the core of the kit may comprise at least one surface (or portion thereof) that comprises a repellency grade number of at least 3 as tested by ISO 23232 dated 2009.

In an additional aspect, a kit comprising a thermoplastic material, a plurality of reinforcing materials, a repellent material, and instructions for producing a prepreg or core using the thermoplastic material, the plurality of reinforcing materials and the repellent material is provided.

In certain embodiments, the kit comprises a substrate. In other embodiments, the substrate comprises a film, a frim, a scrim, a foil, a woven fabric or a non-woven fabric. In some instances, the kit comprises an adhesive. In further examples, the adhesive is a polyolefin adhesive, an ethylene-vinyl acetate adhesive, a polyamide adhesive, a polyester adhesive, a polyurethane adhesive, a thermoplastic polyurethane adhesive, a styrene block copolymer adhesive, a polycarbonate adhesive, a fluoropolymeric adhesive, a silicone adhesive, a silicone rubber adhesive, an elastomeric adhesive, or a pyrrole adhesive. In some instances, the instructions provide for producing a prepreg or the core with at least one surface (or portion thereof) that comprises a repellency grade number of at least 3 as tested by ISO 23232 dated 2009.

In another aspect, a kit comprising a prepreg or core comprising a thermoplastic material and a plurality of repellent treated reinforcing materials dispersed in the thermoplastic material to provide an open cell structure, the repellent treated reinforcing materials effective to decrease absorption of a fluid, e.g., a liquid, adhesive, water or other fluid, into the open cell structure of the prepreg, a substrate in the kit, and instructions for coupling the substrate to the prepreg is provided.

In certain embodiments, the kit comprises a repellent material to treat the substrate. In other embodiments, the substrate comprises a film, a frim, a scrim, a foil, a woven fabric or a non-woven fabric. In some examples, the kit comprises an adhesive. In certain examples, the adhesive is a polyolefin adhesive, an ethylene-vinyl acetate adhesive, a polyamide adhesive, a polyester adhesive, a polyurethane adhesive, a thermoplastic polyurethane adhesive, a styrene block copolymer adhesive, a polycarbonate adhesive, a fluoropolymeric adhesive, a silicone adhesive, a silicone rubber adhesive, an elastomeric adhesive, or a pyrrole adhesive. In some instances, the prepreg or the core of the kit comprises at least one surface (or portion thereof) that comprises a repellency grade number of at least 3 as tested by ISO 23232 dated 2009.

In an additional aspect, a method of reducing the weight of a composite article, the method comprising treating at least one component of the composite article with a repellent material prior to coupling the treated component to another component of the composite article is provided.

In certain embodiments, the treated component is configured as a prepreg or a core or is configured as a substrate to be coupled to a prepreg or core. In some examples, the method comprises selecting the repellent material to promote adhesive bead formation on a surface of the treated component. In other embodiments, the basis weight of the treated component is less than the basis weight of a non-treated component while still providing the same adhesion strength between the treated component and the another component. In some instances, the basis weight of the treated component is reduced by at least 20% when the repellent treatment is used. In certain instances, the treated component comprises least one surface (or portion thereof) that comprises a repellency grade number of at least 3 as tested by ISO 23232 dated 2009.

In another aspect, a method of reducing the amount of adhesive used to couple components of a composite article, the method comprising treating a surface of a component of the composite article, prior to formation of the composite article, with a repellent material that is effective to decrease absorption of a fluid, e.g., a liquid, adhesive, water or other fluid, into the component is provided.

In certain embodiments, the method comprises configuring the surface to be treated as a surface of a prepreg or core or a surface of a substrate. In other embodiments, the method comprises disposing an adhesive on the treated surface. In further embodiments, the method comprises selecting the repellent material to permit at least 20% less adhesive by weight to be used to couple the components and provide the same adhesion strength between components as present when no repellent material is used. In certain examples, the method comprises disposing an effective amount of the repellent material on the surface to promote adhesive bead formation on the surface after deposition of an adhesive on the treated surface. In some instances, the treated surface (or portion thereof) comprises a repellency grade number of at least 3 as tested by ISO 23232 dated 2009.

In an additional aspect, a kit for assembling a shower stall comprising at least one prepreg as described herein and instructions for using the prepreg to install the shower stall is provided. In certain instances, the reinforcing materials of the prepreg comprise reinforcing fibers. In other instances, the reinforcing fibers comprise metal fibers, metalized inorganic fibers, metallized synthetic fibers, glass fibers, carbon fibers, aramid fibers, ceramic fibers and combinations thereof. In some embodiments, the kit comprises at least one surface finishing material selected from an acrylic panel and tiling. In additional embodiments, the kit comprises an adhesive configured to be disposed on a surface of the prepreg between the prepreg and the surface finishing material. In other embodiments, the adhesive comprises a polyolefin adhesive, an ethylene-vinyl acetate adhesive, a polyamide adhesive, a polyester adhesive, a polyurethane adhesive, a thermoplastic polyurethane adhesive, a styrene block copolymer adhesive, a polycarbonate adhesive, a fluoropolymeric adhesive, a silicone adhesive, a silicone rubber adhesive, an elastomeric adhesive, or a pyrrole adhesive. In some instances, the repellent material is effective to render the adhesive temperature insensitive. In other instances, the thermoplastic material comprises polyethylene, polypropylene, polystyrene, acrylonitrylstyrene, butadiene, polyethyleneterephthalate, polybutyleneterephthalate, polybutylenetetrachlorate, polyvinyl chloride, polyphenylene ether, polycarbonates, polyestercarbonates, thermoplastic polyesters, polyimides, polyamides, polyetherimides, acrylonitrile-butylacrylate-styrene polymers, amorphous nylon, polyarylene ether ketone, polyphenylene sulfide, polyaryl sulfone, polyether sulfone, poly(1,4phenylene) compounds, silicones and combinations thereof. In some instances, the kit comprises a plurality of prepregs, each comprising a prepreg as described herein, in which each prepreg is sized and arranged to cover one surface of a wall structure configured to receive a shower panel. In some embodiments, the kit comprises a plurality of shower panels. In some instances, the prepreg surface (or portion thereof) comprises a repellency grade number of at least 3 as tested by ISO 23232 dated 2009.

In another aspect, a kit for assembling a shower stall comprising at least one core of and instructions for using the core to install the shower stall is provided. In certain embodiments, the reinforcing materials of the core comprise reinforcing fibers. In other embodiments, the reinforcing fibers comprise metal fibers, metalized inorganic fibers, metallized synthetic fibers, glass fibers, carbon fibers, aramid fibers, ceramic fibers and combinations thereof. In some instances, the kit comprises at least one surface finishing material selected from an acrylic panel and tiling. In other instances, the kit comprises an adhesive configured to be disposed on a surface of the core between the core and the surface finishing material. In further examples, the adhesive comprises a polyolefin adhesive, an ethylene-vinyl acetate adhesive, a polyamide adhesive, a polyester adhesive, a polyurethane adhesive, a thermoplastic polyurethane adhesive, a styrene block copolymer adhesive, a polycarbonate adhesive, a fluoropolymeric adhesive, a silicone adhesive, a silicone rubber adhesive, an elastomeric adhesive, or a pyrrole adhesive. In some embodiments, the repellent material is effective to render the adhesive temperature insensitive. In other embodiments, the thermoplastic material comprises polyethylene, polypropylene, polystyrene, acrylonitrylstyrene, butadiene, polyethyleneterephthalate, polybutyleneterephthalate, polybutylenetetrachlorate, polyvinyl chloride, polyphenylene ether, polycarbonates, polyestercarbonates, thermoplastic polyesters, polyimides, polyamides, polyetherimides, acrylonitrile-butylacrylate-styrene polymers, amorphous nylon, polyarylene ether ketone, polyphenylene sulfide, polyaryl sulfone, polyether sulfone, poly(1,4phenylene) compounds, silicones and combinations thereof. In some instances, the kit comprises a plurality of cores, each comprising the core of claim 21 or the core of claim 31, in which each prepreg is sized and arranged to cover one surface of a wall structure configured to receive a shower panel. In certain instances, the kit comprises a plurality of shower panels. In some embodiments, the kit comprises a plurality of shower panels. In some instances, the prepreg surface (or portion thereof) comprises a repellency grade number of at least 3 as tested by ISO 23232 dated 2009.

In another aspect, a kit for assembling a shower stall comprising at least one composite article described herein and instructions for using the article to install the shower stall is provided. In some instances, a surface (or portion thereof) of the article comprises a repellency grade number of at least 3 as tested by ISO 23232 dated 2009.

In an additional aspect, a kit for finishing an interior surface of a building, the kit comprising one of the prepregs described herein, one of the cores described herein, or one of the composite articles described herein is provided. In some instances, a surface (or portion thereof) of the prepreg, core or article comprises a repellency grade number of at least 3 as tested by ISO 23232 dated 2009.

In another aspect, a method of deterring mold growth in a building structure, the method comprising installing at least one prepreg as described herein on an interior surface of the building structure is provided. In some instances, a surface (or portion thereof) of the prepreg comprises a repellency grade number of at least 3 as tested by ISO 23232 dated 2009.

In another aspect, a method of deterring mold growth in a building structure, the method comprising installing at least one core as described herein on an interior surface of the building structure is provided. In some instances, a surface (or portion thereof) of the core comprises a repellency grade number of at least 3 as tested by ISO 23232 dated 2009.

In an additional aspect, a method of deterring mold growth in a building structure, the method comprising installing at least one composite article as described herein on an interior surface of the building structure is provided. In some instances, a surface (or portion thereof) of the article comprises a repellency grade number of at least 3 as tested by ISO 23232 dated 2009.

In another aspect, a method of facilitating production of an antifungal surface, the method comprising providing one of the prepregs as described herein and providing instructions for using the prepreg to provide the antifungal surface is disclosed. In some instances, a surface (or portion thereof) of the prepreg comprises a repellency grade number of at least 3 as tested by ISO 23232 dated 2009.

In another aspect, a method of facilitating production of an antifungal surface, the method comprising providing one of the cores as described herein and providing instructions for using the core to provide the antifungal surface is disclosed. In some instances, a surface (or portion thereof) of the core comprises a repellency grade number of at least 3 as tested by ISO 23232 dated 2009.

In another aspect, a method of facilitating production of an antifungal surface, the method comprising providing one of the composite articles as described herein and providing instructions for using the article to provide the antifungal surface is disclosed. In some instances, a surface (or portion thereof) of the article comprises a repellency grade number of at least 3 as tested by ISO 23232 dated 2009.

In an additional aspect, a prepreg comprising a thermoplastic material and a plurality of reinforcing materials dispersed in the thermoplastic material to provide an open cell structure, the prepreg further comprising a repellent treatment on at least one surface of the prepreg, the repellent treatment effective to decrease absorption of a fluid into the open cell structure of the prepreg, in which some portion of a surface of the prepreg comprises a repellency grade number of at least 3 as tested by ISO 23232 dated 2009 is provided.

In certain embodiments, the reinforcing materials comprise reinforcing fibers. In other embodiments, the reinforcing fibers are present from about 20 weight percent to about 80 weight percent based on the weight of the prepreg. In some examples, the reinforcing fibers comprise metal fibers, metalized inorganic fibers, metallized synthetic fibers, glass fibers, carbon fibers, aramid fibers, ceramic fibers and combinations thereof. In certain embodiments, the prepreg may comprise an adhesive layer disposed on the at least one surface comprising the repellent treatment. In other instances, the adhesive layer comprises a polyolefin adhesive, an ethylene-vinyl acetate adhesive, a polyamide adhesive, a polyester adhesive, a polyurethane adhesive, a thermoplastic polyurethane adhesive, a styrene block copolymer adhesive, a polycarbonate adhesive, a fluoropolymeric adhesive, a silicone adhesive, a silicone rubber adhesive, an elastomeric adhesive, or a pyrrole adhesive. In certain examples, the prepreg may comprise a substrate disposed on the adhesive layer. In other embodiments, the repellent material is effective to render the adhesive temperature insensitive. In further embodiments, the thermoplastic material of the prepreg comprises polyethylene, polypropylene, polystyrene, acrylonitrylstyrene, butadiene, polyethyleneterephthalate, polybutyleneterephthalate, polybutylenetetrachlorate, polyvinyl chloride, polyphenylene ether, polycarbonates, polyestercarbonates, thermoplastic polyesters, polyimides, polyamides, polyetherimides, acrylonitrile-butylacrylate-styrene polymers, amorphous nylon, polyarylene ether ketone, polyphenylene sulfide, polyaryl sulfone, polyether sulfone, poly(1,4phenylene) compounds, silicones and combinations thereof. In some instances, the prepreg may comprise a flame retardant.

In another aspect, a prepreg comprising a thermoplastic material and a plurality of repellent treated reinforcing materials dispersed in the thermoplastic material to provide an open cell structure, the repellent treated reinforcing materials effective to decrease absorption of a fluid into the open cell structure of the prepreg, in which some portion of a surface of the prepreg comprises a repellency grade number of at least 3 as tested by ISO 23232 dated 2009 is disclosed.

In certain embodiments, the reinforcing materials comprise reinforcing fibers. In certain examples, the reinforcing fibers are present from about 20 weight percent to about 80 weight percent based on the weight of the prepreg. In other examples, the reinforcing fibers comprise metal fibers, metalized inorganic fibers, metallized synthetic fibers, glass fibers, carbon fibers, aramid fibers, ceramic fibers and combinations thereof. In certain embodiments, the prepreg may further comprise an adhesive layer disposed on the at least one surface comprising the repellent treated reinforcing materials. In other embodiments, the adhesive layer comprises a polyolefin adhesive, an ethylene-vinyl acetate adhesive, a polyamide adhesive, a polyester adhesive, a polyurethane adhesive, a thermoplastic polyurethane adhesive, a styrene block copolymer adhesive, a polycarbonate adhesive, a fluoropolymeric adhesive, a silicone adhesive, a silicone rubber adhesive, an elastomeric adhesive, or a pyrrole adhesive. In certain instances, the prepreg further comprises a substrate disposed on the adhesive layer. In other examples, the repellent treated reinforcing materials are effective to render the adhesive temperature and/or viscosity insensitive. In some examples, the thermoplastic material comprises polyethylene, polypropylene, polystyrene, acrylonitrylstyrene, butadiene, polyethyleneterephthalate, polybutyleneterephthalate, polybutylenetetrachlorate, polyvinyl chloride, polyphenylene ether, polycarbonates, polyestercarbonates, thermoplastic polyesters, polyimides, polyamides, polyetherimides, acrylonitrile-butylacrylate-styrene polymers, amorphous nylon, polyarylene ether ketone, polyphenylene sulfide, polyaryl sulfone, polyether sulfone, poly(1,4phenylene) compounds, silicones and combinations thereof. In certain instances, the prepreg comprises a flame retardant.

In an additional aspect, a core comprising a web of open celled structures defined by random crossing over of reinforcing materials held together by a thermoplastic material, the core comprising a repellent treatment on a surface of the core, in which the repellent treatment is effective to decrease absorption of a fluid into voids of the core, in which some portion of a surface of the core comprises a repellency grade number of at least 3 as tested by ISO 23232 dated 2009 is provided.

In certain examples, the reinforcing materials comprise reinforcing fibers. In other examples, the reinforcing fibers are present from about 20 weight percent to about 80 weight percent based on the weight of the core. In further embodiments, the reinforcing fibers comprise metal fibers, metalized inorganic fibers, metallized synthetic fibers, glass fibers, carbon fibers, aramid fibers, ceramic fibers and combinations thereof. In some examples, the core may comprise an adhesive layer disposed on the at least one surface comprising the repellent treatment. In other examples, the adhesive layer comprises a polyolefin adhesive, an ethylene-vinyl acetate adhesive, a polyamide adhesive, a polyester adhesive, a polyurethane adhesive, a thermoplastic polyurethane adhesive, a styrene block copolymer adhesive, a polycarbonate adhesive, a fluoropolymeric adhesive, a silicone adhesive, a silicone rubber adhesive, an elastomeric adhesive, or a pyrrole adhesive. In certain instances, the core may comprise a substrate disposed on the adhesive layer. In other instances, the repellent material is effective to render the adhesive temperature insensitive. In further examples, the thermoplastic material comprises polyethylene, polypropylene, polystyrene, acrylonitrylstyrene, butadiene, polyethyleneterephthalate, polybutyleneterephthalate, polybutylenetetrachlorate, polyvinyl chloride, polyphenylene ether, polycarbonates, polyestercarbonates, thermoplastic polyesters, polyimides, polyamides, polyetherimides, acrylonitrile-butylacrylate-styrene polymers, amorphous nylon, polyarylene ether ketone, polyphenylene sulfide, polyaryl sulfone, polyether sulfone, poly(1,4phenylene) compounds, silicones and combinations thereof. In some embodiments, the core may include a flame retardant.

In another aspect, a core comprising a web of open celled structures defined by random crossing over of a plurality of repellent treated reinforcing materials held together by a thermoplastic material, in which the repellent treated reinforcing materials are effective to decrease absorption of a fluid into voids of the core, in which some portion of a surface of the core comprises a repellency grade number of at least 3 as tested by ISO 23232 dated 2009 is described.

In certain embodiments, the reinforcing materials comprise reinforcing fibers. In other embodiments, the reinforcing fibers are present from about 20 weight percent to about 80 weight percent based on the weight of the core. In additional examples, the reinforcing fibers comprise metal fibers, metalized inorganic fibers, metallized synthetic fibers, glass fibers, carbon fibers, aramid fibers, ceramic fibers and combinations thereof. In certain examples, the core may comprise an adhesive layer disposed on the at least one surface comprising the repellent treated reinforcing materials. In some instances, the adhesive layer comprises a polyolefin adhesive, an ethylene-vinyl acetate adhesive, a polyamide adhesive, a polyester adhesive, a polyurethane adhesive, a thermoplastic polyurethane adhesive, a styrene block copolymer adhesive, a polycarbonate adhesive, a fluoropolymeric adhesive, a silicone adhesive, a silicone rubber adhesive, an elastomeric adhesive, or a pyrrole adhesive. In other embodiments, the core may comprise a substrate disposed on the adhesive layer. In some embodiments, the repellent material is effective to render the adhesive temperature and/or viscosity insensitive. In certain instances, the thermoplastic material comprises polyethylene, polypropylene, polystyrene, acrylonitrylstyrene, butadiene, polyethyleneterephthalate, polybutyleneterephthalate, polybutylenetetrachlorate, polyvinyl chloride, polyphenylene ether, polycarbonates, polyestercarbonates, thermoplastic polyesters, polyimides, polyamides, polyetherimides, acrylonitrile-butylacrylate-styrene polymers, amorphous nylon, polyarylene ether ketone, polyphenylene sulfide, polyaryl sulfone, polyether sulfone, poly(1,4phenylene) compounds, silicones and combinations thereof. In some examples, the core may comprise a flame retardant.

Additional aspects, examples, embodiments and features are described in more detail below.

BRIEF DESCRIPTION OF THE FIGURES

Certain features, aspect and components of illustrative configurations are described in more detail below in which.

Figure 1:
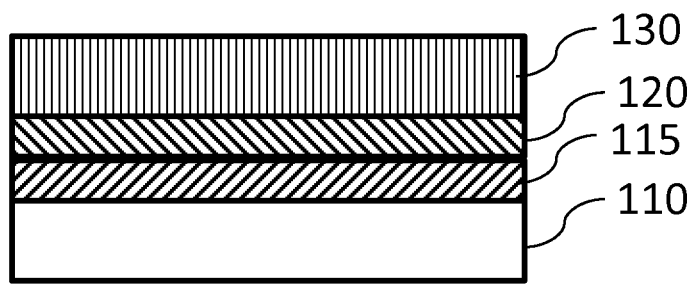
FIG. 1 is an illustration of an article comprising a substrate coupled to a prepreg or core using a repellent material and optionally an adhesive, in accordance with certain configurations.

The particular dimensions, thicknesses and arrangement of the components of the figures are provided for illustration purposes. Unless otherwise specified, the thickness of one component, relative to the thickness of another component, may be varied as desired. Where materials are described as being present on a surface, the material may be present across the entire surface or only a portion thereof.

DETAILED DESCRIPTION

Certain embodiments, examples, and configurations are described below to illustrate better some of the many attributes, advancements and features of the technology. Reference to the terms "top," "bottom" or "side" is provided for convenience purposes only and not intended to limit a particular surface, or portion thereof, where two or more components may be coupled to each other. The term "layer" is referred to below in certain instances for illustration purposes. Where a material is stated to be present in a "layer," the material may instead be coated on individual materials or portions thereof instead of being a solid or continuous layer across a surface of a component. The term "fluid" is used herein in certain instances and is intended to refer to liquids, oils, gases, and materials in the form of a liquid or flowable semi-solid, e.g., liquid adhesives including water based adhesives, oil based adhesives and the like.

In certain configurations of the prepregs, cores, substrates and articles described herein, one or more components may be coated or treated with a repelling agent also referred to herein in certain instances as a repellent. While not wishing to be bound by any particular scientific theory, the repelling agent may generally be effective to promote decreased fluid absorption rates into a substrate, or component thereof. For example, in a typical porous thermoplastic composite material, liquid adhesive disposed on the surface may be drawn into the porous interior quickly reducing the amount present on the surface for coupling another component. In certain embodiments of the articles and components thereof described herein, one or more components may be treated with a repellent to promote retention of the fluid, e.g., adhesive, on a bonding surface of a substrate to enhance bonding to another substrate or component. In some examples, the enhanced retention of the adhesive on a bonding substrate permits the use of less adhesive for a desired bonding strength, permits the use of lighter materials while providing a similarly desired peel strength or may permit the use of adhesives, e.g., less viscous adhesives such as liquid adhesives, that otherwise may not be useable due to fast absorption into the interior of the substrate.

In certain embodiments, the repellents and repellent coatings described herein can be selected from suitable compounds and materials that can promote fluid bead formation on a surface of a material. For example, in the absence of the repellent material, when a fluid is added to an open cell or porous substrate, a substantial amount of the fluid is drawn into the interior void space by way of capillary action. By including a repellent material, the fluid may form beads on the surface and generally be retained on the surface to a more substantial degree than when no repellent material is present on the material. Illustrative repellent compounds and materials include, but are not limited to, compounds comprising silicon (Si) such as, for example, siloxanes, polysiloxanes, silanes and organosilanes, compounds comprising perfluoro groups (e.g., a perfluoroether or a perfluoropolymer), fluoropolymers such as polytetrafluoroethylene, arsenates, and other materials which are effective to promote reduced absorption of adhesives into the interior of a substrate. While the repellent material may provide for enhanced retention of fluid on a surface, it can be desirable to permit some fluid, e.g., some adhesive, to be absorbed into the substrate to provide an anchoring effect between the substrate and another component. By permitting some penetration of liquid adhesive but providing enhanced amounts on the surface, delamination of components can be greatly reduced.

In some embodiments, where a liquid adhesive is used with a repellent material, the repellent may be used in an effective amount to permit at least 20% or 25% less adhesive (by weight) to be present between two components to provide the same or greater adhesion strength. For example, where a polyethyleneterephthalate substrate is coupled to a fiber bearing polypropylene core, the coupling of the two components provides a certain adhesion strength between them. The addition of a repellent material to the substrate or the core can permit the use of at least 20% or 25% or less adhesive by weight to provide the same adhesion strength as when no repellent material is present but where increased amounts of adhesive are required. In some examples, the presence of a repellent treatment on the substrate may permit the use of at least 30% less adhesive by weight, 35% less adhesive by weight, 40% less adhesive by weight, 45% less adhesive by weight or even less than 50% by weight adhesive to provide the same adhesion or bonding strength provided when increased amounts of adhesive are used but where no repellent treatment is present.

In certain configurations, the presence of a repellent treatment may permit lighter weight substrates to be used, which can reduce the overall cost of the article. For example, the enhanced adhesion strength permits the use of thinner materials, e.g., thinner scrims or other substrates, while still providing the desired aesthetic and performance characteristics. In some embodiments, the basis weight of the substrate that is coupled to a prepreg or core (as described in more detail below) may be reduced by at least 20%, 25% or 30% as compared with the weight of a substrate needed to provide the same performance characteristics, e.g., adhesion strength, resistance to delamination, etc. where no repellent material is present. It is an unexpected result that, when a repellent material is present, a lower basis weight substrate can be present in an article even where lesser amounts of adhesive are present and the performance characteristics are the same or better as when the basis weight of the substrate is more and the amount of adhesive used is more but where no repellent material is present. In certain instances, the basis weight of the substrate may be about 10 grams per square meter (gsm), 15 gsm, 20, gsm, 25 gsm, 30 gsm or any value in between these values while still providing suitable performance characteristics. Substrates with basis weights greater than 30 gsm may also be used if desired though heavier articles will be produced when heavier substrates are present. As noted below, the overall basis weight of the article may be reduced, while still retaining desired properties, when a repellent material is present as compared to a similar article that lacks a repellent but has the same desired properties.

In some instances, the repellent material is effective to render the fluid temperature insensitive and/or viscosity insensitive. For example, in many instances, a liquid adhesive must be selected based on a desired cure time which varies with ambient temperature in the processing environment. In colder temperatures, a faster cure adhesive may be needed to provide suitable adhesion strength. In warmer temperatures, a slower curing adhesive may be used. In embodiments described herein, enhanced retention of the adhesive on the surface by the presence of a repellent material generally renders the adhesive suitable for use over a much broader ambient temperature range, e.g., 0 degrees Celsius up to 40 degrees Celsius. By using a repellent material, for example, a single liquid adhesive can be used over a much broader temperature range. Similarly, as the repellent material is selected to reduce absorption of fluid into the core (or the substrate or both), the viscosity of the fluid generally does not matter when it comes to performing one or more processing operations using the fluid.

In certain embodiments, the prepregs, cores, composites and articles described herein may comprise two or more different components which can be coupled to each other, at least in part, using one or more fluids, e.g., liquid adhesives that are water based adhesives or oil based adhesives. In some embodiments, a prepreg comprising one or more thermoplastic materials and comprising a surface coating can be used. For example, the prepreg may comprise one or more thermoplastic materials in combination with one or more other materials, e.g., a filler, an additive, a flame retardant, a smoke suppressant, lofting agents, a strengthening agent, powders, particles, biocidal agents, fibers, whiskers, nanomaterials, nanostructures, nanofibers or other materials that can impart desired physical or chemical properties to the prepreg. In some embodiments, the prepreg is a substantially porous structure comprising open cell structures formed by processing of the thermoplastic material and/or other materials used with the thermoplastic material. The open cell structure provides a generally porous or permeable structure which reduces the overall weight of the core. For example, the void content of prepreg, prior to processing, may range in general between about 5% and about 95% and in particular between about 30% and about 80% of the total volume of prepreg. In another embodiment, a porous prepreg can be made up of open cell structures formed by random crossing over of reinforcing materials held together, at least in part, by one or more thermoplastic materials, where about 5% to about 100% of the cell structure are open and allow the flow of air and gases through. In certain instances, the open cell structure can be designed to permit passage or air or gases while hindering, to at least some degree, the passage of a fluid. As noted herein, addition of a repellent material can further inhibit absorption of fluid into the open cell structure. In some instances, the prepreg comprises a density of about 0.1 gm/cc to about 2.0 gm/cc and in another embodiment about 0.3 gm/cc to about 1.0 gm/cc. The exact process used to form the prepreg may vary, and illustrative processes include, but are not limited to, a wet laid process, an air laid process, a dry blend process, a carding and needle process, and other known process that are employed for making non-woven products. Combinations of such manufacturing processes are also useful. In preparing the prepreg, the thermoplastic material can be heated above the glass transition temperature of the thermoplastic material to substantially soften the plastic materials. The softened material can be passed through one or more consolidation devices, for example nip rollers, calendaring rolls, double belt laminators, indexing presses, multiple daylight presses, autoclaves, and other such devices used for lamination and consolidation of sheets and fabrics so that the plastic material can flow. The gap between the consolidating elements in the consolidation devices are set to a dimension less than that of the unconsolidated web and greater than that of the web if it were to be fully consolidated, thus allowing the prepreg to expand and remain substantially permeable after passing through the rollers. In one embodiment, the gap is set to a dimension about 5% to about 10% greater than that of the prepreg if it were to be fully consolidated. A fully consolidated prepreg is fully compressed and substantially void free. A fully consolidated prepreg would have less than 5% void content and have negligible open cell structure. In embodiments described herein, the porosity or void content of the prepreg may be desirably greater than 50%, based on the total volume of the prepreg, as the presence of a repellent, even where high porosities are present, reduces absorption of fluids by the prepreg. As noted herein, the prepreg may be further processed to provide a core layer, a composite material or an article.

In certain configurations, the thermoplastic material of the prepreg may comprise, at least in part, one or more of polyethylene, polypropylene, polystyrene, acrylonitrylstyrene, butadiene, polyethyleneterephthalate, polybutyleneterephthalate, polybutylenetetrachlorate, and polyvinyl chloride, both plasticized and unplasticized, and blends of these materials with each other or other polymeric materials. Other suitable thermoplastics include, but are not limited to, polyarylene ethers, polycarbonates, polyestercarbonates, thermoplastic polyesters, polyimides, polyetherimides, polyamides, acrylonitrile-butylacrylate-styrene polymers, amorphous nylon, polyarylene ether ketone, polyphenylene sulfide, polyaryl sulfone, polyether sulfone, liquid crystalline polymers, poly(1,4 phenylene) compounds commercially known as PARMAX®, high heat polycarbonate such as Bayer's APEC® PC, high temperature nylon, and silicones, as well as alloys and blends of these materials with each other or other polymeric materials. The thermoplastic material used to form the prepreg can be used in powder form, resin form, rosin form, fiber form or other suitable forms.

In some instances, once the prepreg is formed, but prior to curing or further processing, a repellent may be disposed on or otherwise added to one or more surfaces of the prepreg. For example, the prepreg may be dipped into the repellent, or repellent may be sprayed, coated, rolled, brushed or otherwise disposed on one or more surfaces of the prepreg. The exact amount of repellent disposed on the prepreg may depend, for example, on the adhesive to be used, the desired bonding strength to another component, processing temperatures or other considerations. In some instances, the repellent is disposed to provide a generally continuous coating over a surface, whereas in other instances the repellent may be disposed only in certain areas. In some instances, enough repellent is disposed such that 25% or less (by weight or by volume as desired) adhesive can be used to adhere a substrate to the prepreg at a selected bonding strength as compared to the amount of adhesive needed to provide the same bonding strength when no repellent is present. In other configurations, enough repellent is disposed such that 50% or less (by weight or by volume as desired) adhesive can be used to adhere a substrate to the prepreg at a selected bonding strength as compared to the amount of adhesive needed to provide the same bonding strength when no repellent is present. In other examples, enough repellent is disposed such that 60%, 65%, 70%, 75% or 80% or less (by weight or by volume as desired) adhesive can be used to adhere a substrate to the prepreg at a selected bonding strength as compared to the amount of adhesive needed to provide the same bonding strength when no repellent is present. In certain embodiments, the repellent may be cured or dried on the prepreg prior to disposal of any adhesive or substrate on the prepreg. In other instances, the repellent can be disposed on the prepreg subsequent to prepreg formation, and an adhesive (or other fluid) can be disposed on the prepreg prior to any curing or drying of the repellent. In some embodiments, an adhesive can be co-added with a repellent agent, e.g., by co-spraying or co-coating, to increase the rate at which material can be produced.

In some examples, once the repellent is added to the prepreg or a surface thereof, a suitable amount of an adhesive material, which may comprise any one or more adhesives described herein or other suitable materials which can provide some adherence, is then added followed by placement of another substrate on the adhesive bearing prepreg. As noted herein, the additional substrate may take many forms including, but not limited to, scrims (woven or nonwoven), films, frims (woven or non-woven), fabrics (woven or non-woven) and other substrate materials as described herein. The adhesive may be permitted to cure, e.g., using heat, drying, molding, pressure, light, cross-linkers or other physical or chemical means to couple the substrate (to at least some degree) to the prepreg. The presence of the repellent on the prepreg can promote bead formation of the liquid adhesive on the prepreg surface as noted in more detail below. Bead formation generally can increase the surface level of adhesive and promote better adhesion between the substrate and the prepreg. While it may be desirable to promote bead formation, it can also be desirable to permit a certain level of adhesive to enter into the porous prepreg to anchor the adhesive in the core. In addition, the prepreg itself may provide some adherence to the substrate. The combination of added adhesive with the adhesive nature of a repellent coated prepreg can provide increased bonding strength to the substrate. Depending on the desired level of adherence between the substrate and the prepreg, different amounts of repellent can be added to promote more adherence or favor less adherence.

In some examples, the repellent can be used to provide an article that may be a composite article that includes a porous or permeable core coupled to one or more additional substrates or layers. In some embodiments, the porous core may comprise one or more thermoplastic materials and can be the cured or processed form of the prepregs described herein. For example, the porous core may comprise one or more thermoplastic materials in combination with a filler, an additive, a flame retardant, a smoke suppressant, a strengthening agent, lofting agents, powders, particles, biocidal agents, fibers, whiskers, nanomaterials, nanostructures, nanofibers or other materials that can impart desired physical or chemical properties to the core. In some embodiments, the core comprises a web made up of open cell structures formed by random crossing over of reinforcing materials held together, at least in part, by one or more thermoplastic materials. The web provides a generally porous structure which reduces overall weight of the core. For example, the void content of core ranges in general between about 5% and about 95% and in particular between about 30% and about 80% of the total volume of core. In an another embodiment, a porous core can be made up of open cell structures formed by random crossing over of reinforcing materials held together, at least in part, by one or more thermoplastic materials, where about 40% to about 100% of the cell structure are open and allow the flow of air and gases through. In some instances, the core comprises a density of about 0.1 gm/cc to about 2.0 gm/cc and in another embodiment about 0.3 gm/cc to about 1.0 gm/cc. The exact process used to form the core may vary, and illustrative processes include, but are not limited to, a wet laid process, an air laid process, a dry blend process, a carding and needle process, and other known process that are employed for making non-woven products. Combinations of such manufacturing processes are also useful. In preparing the core, the web comprising the thermoplastic material can be heated above the glass transition temperature of the thermoplastic material to substantially soften the plastic materials. The softened material can be passed through one or more consolidation devices, for example nip rollers, calendaring rolls, double belt laminators, indexing presses, multiple daylight presses, autoclaves, and other such devices used for lamination and consolidation of sheets and fabrics so that the plastic material can flow. The gap between the consolidating elements in the consolidation devices are set to a dimension less than that of the unconsolidated web and greater than that of the web if it were to be fully consolidated, thus allowing the web to expand and remain substantially permeable after passing through the rollers. In one embodiment, the gap is set to a dimension about 5% to about 10% greater than that of the web if it were to be fully consolidated. A fully consolidated web means a web that is fully compressed and substantially void free. A fully consolidated web would have less than 5% void content and have negligible open cell structure. In embodiments described herein, the porosity or void content of the core may be desirably greater than 50%, based on the total volume of the core, as the presence of a repellent, even where high porosities are present, reduces absorption of adhesive by the core.

In certain configurations, the thermoplastic material of the core may comprise, at least in part, one or more of poly-ethylene, polypropylene, polystyrene, acrylonitrylstyrene, butadiene, polyethyleneterephthalate, polybutyleneterephthalate, polybutylenetetrachlorate, and polyvinyl chloride, both plasticized and unplasticized, and blends of these materials with each other or other polymeric materials. Other suitable thermoplastics include, but are not limited to, polyarylene ethers, polycarbonates, polyestercarbonates, thermoplastic polyesters, polyimides, polyetherimides, polyamides, acrylonitrile-butylacrylate-styrene polymers, amorphous nylon, polyarylene ether ketone, polyphenylene sulfide, polyaryl sulfone, polyether sulfone, liquid crystalline polymers, poly(1,4 phenylene) compounds commercially known as PARMAX®, high heat polycarbonate such as Bayer's APEC® PC, high temperature nylon, and silicones, as well as alloys and blends of these materials with each other or other polymeric materials. The thermoplastic material used to form the web of the composite article can be used in powder form, resin form, rosin form, fiber form or other suitable forms. Illustrative thermoplastic materials in various forms are described herein and are also described, for example in U.S. Publication Nos. 20130244528 and US20120065283.

In some instances, once the core is formed, a repellent may be disposed on or otherwise added to one or more surfaces of the core. For example, the core may be dipped into the repellent, or repellent may be sprayed, coated, rolled, brushed or otherwise disposed on one or more surfaces of the core. The exact amount of repellent disposed on the core may depend, for example, on the adhesive to be used, the desired bonding strength to another component, processing temperatures or other considerations. In some instances, the repellent is disposed to provide a generally continuous coating over a surface, whereas in other instances the repellent may be disposed only in certain areas. In some instances, enough repellent is disposed such that 25% or less (by weight or by volume as desired) adhesive can be used to adhere a substrate to the core at a selected bonding strength as compared to the amount of adhesive needed to provide the same bonding strength when no repellent is present. In other configurations, enough repellent is disposed such that 50% or less (by weight or by volume as desired) adhesive can be used to adhere a substrate to the core at a selected bonding strength as compared to the amount of adhesive needed to provide the same bonding strength when no repellent is present. In other examples, enough repellent is disposed such that 60%, 65%, 70%, 75% or 80% or less (by weight or by volume as desired) adhesive can be used to adhere a substrate to the core at a selected bonding strength as compared to the amount of adhesive needed to provide the same bonding strength when no repellent is present. In certain embodiments, the repellent may be cured or dried on the core prior to disposal of any adhesive on the core. In other instances, the repellent can be disposed on the core subsequent to core formation, and an adhesive can be disposed on the core prior to any curing or drying of the repellent. In some embodiments, an adhesive can be co-added with a repellent agent, e.g., by co-spraying or co-coating, to increase the rate at which material can be produced.

In some examples, once the repellent is added to the core or a surface thereof, a suitable amount of an adhesive material, which may comprise any one or more adhesives described herein or other suitable materials which can provide some adherence, is then added followed by placement of another substrate on the adhesive bearing core. As noted herein, the additional substrate may take many forms including, but not limited to, scrims (woven or non-woven), films, frims (woven or non-woven), fabrics (woven or non-woven) and other substrate materials as described herein. The adhesive may be permitted to cure, e.g., using heat, drying, molding, pressure, light, cross-linkers or other physical or chemical means to couple the substrate to the core. The presence of the repellent on the core can promote bead formation of the adhesive on the core surface as noted in more detail below. Bead formation generally can increase the surface level of adhesive and promote better adhesion between the substrate and the core. While it may be desirable to promote bead formation, it can also be desirable to permit a certain level of adhesive to enter into the porous core to anchor the adhesive in the core. Depending on the desired level of adherence between the substrate and the core, different amounts of repellent can be added to promote more adherence or favor less adherence.

In some instances, the prepreg or the core of the article may comprise reinforcing fibers to impart strength to the prepregs or articles. For example, the prepreg or core may comprise a plurality of reinforcing fibers. In some embodiments, about 20% to about 80% by weight fibers (based on the weight of the prepreg or the core), more particularly about 20% to about 50% by weight fibers, 35% to 60% by weight fibers, or about 50% to about 80% by weight fibers may be present in the prepreg or the core. In some instances, the fibers may comprise the same type of fibers in the prepreg or core, whereas in other instances, different fibers may be present in the prepreg or core. In some configurations, fibers comprising a high tensile modulus of elasticity and an average length of between about 7 and about 200 mm may be used. Where a plurality of fibers are present in the prepreg or the core, the materials can be heated above the glass transition temperature of the thermoplastic materials to substantially soften the plastic materials. The softened material can then be provided to one or more consolidation devices, for example nip rollers, calendaring rolls, double belt laminators, indexing presses, multiple daylight presses, autoclaves, and other such devices used for lamination and consolidation of sheets and fabrics so that the plastic material can flow and wet out the fibers. The gap between the consolidating elements in the consolidation devices can be set to a dimension less than that of the unconsolidated web and greater than that of the web if it were to be fully consolidated, thus allowing the web to expand and remain substantially permeable after passing through the rollers. In one embodiment, the gap is set to a dimension about 5% to about 10% greater than that of the web if it were to be fully consolidated. A fully consolidated web refers to a web that is fully compressed and substantially void free. A fully consolidated web would have less than 5% void content and have negligible open cell structure.

In certain configurations, the fibers may comprise a repellent coating prior to combining them with the prepreg thermoplastic materials or the thermoplastic materials of the core. For example, the fibers may be sprayed, coated with, dipped into or otherwise include a repellent coating on the surface of the fibers. As noted herein, the repellent nature of the repellent material generally acts to reduce the rate of absorption of materials such as fluids into the prepreg or core. In some instances, fibers comprising a repellent coating can be used along with fibers without any repellent coating. For example, interior portions of the prepreg or core may comprise fibers without any repellent coating, and fibers comprising a repellent coating may be added directly to a surface of the prepreg to place such repellent coated fibers in proximity to a surface that can be coupled to a substrate. Where some fibers are coated with a repellent and others fibers are not coated with a repellent, the fiber composition and length may be the same or may be different. While not wishing to be bound by any particular scientific theory, it may be desirable to increase the overall length of repellent coated fibers to provide longer and generally continuous coated fibers near the surface of the prepreg or the core. In other instances, a plurality of repellent coated short fibers (shorter than those present in the interior of the core) can be used on the surface to assist in bonding to other layers of the article and/or reduction of fluid absorption into interior portions of the core.

Illustrative types of reinforcing fibers include, but are not limited to, glass fibers, carbon fibers, graphite fibers, synthetic organic fibers, particularly high modulus organic fibers such as, for example, para- and meta-aramid fibers, nylon fibers, polyester fibers, or any of the high melt flow index resins described herein that are suitable for use as fibers, natural fibers such as hemp, sisal, jute, flax, coir, kenaf and cellulosic fibers, mineral fibers such as basalt, mineral wool (e.g., rock or slag wool), wollastonite, alumina silica, and the like, or mixtures thereof, metal fibers, metalized natural and/or synthetic fibers, ceramic fibers, yarn fibers, or mixtures thereof. In some embodiments, any of the aforementioned fibers can be chemically treated prior to use to provide desired functional groups or to impart other physical properties to the fibers, e.g., may be chemically treated with one or more repellent coatings. The fiber content in the prepreg or core may be from about 20% to about 90%, more particularly from about 30% to about 70%, by weight of the prepreg or core. Typically, the fiber content of the composite varies between about 20% to about 90% by weight, more particularly about 30% by weight to about 80% by weight, e.g., about 40% to about 70% by weight of the composite. The particular size and/or orientation of the fibers used may depend, at least in part, on the polymer material used and/or the desired properties of the resulting composite. Suitable additional types of fibers, fiber sizes and amounts will be readily selected by the person of ordinary skill in the art, given the benefit of this disclosure. In one non-limiting illustration, fibers dispersed within a thermoplastic material, forming the polymer core of a composite, for example, generally have a diameter of greater than about 5 microns, more particularly from about 5 microns to about 22 microns, and a length of from about 5 mm to about 200 mm; more particularly, the fiber diameter may be from about microns to about 22 microns and the fiber length may be from about 5 mm to about 75 mm.

In some embodiments, the prepregs and core layers described herein may comprise one or more flame retardants. In some instances, the flame retardants may be halogenated flame retardants or substantially halogen free flame retardants or halogen free flame retardants. For example, the prepregs and core layers can comprise a halogenated flame retardant that comprises one of more of F, Cl, Br, I, and At or compounds that including such halogens, e.g., tetrabromo bisphenol-A polycarbonate or monohalo-, dihalo-, trihalo- or tetrahalo-polycarbonates. In some instances, the thermoplastic material used in the prepregs and cores may comprise one or more halogens to impart some flame retardancy without the addition of another flame retardant agent. Where halogenated flame retardants are present, the flame retardant is desirably present in a flame retardant amount, which can vary depending on the other components which are present. For example, the halogenated flame retardant may be present in about 0.1 weight percent to about 15 weight percent (based on the weight of the prepreg or core), more particularly about 1 weight percent to about 13 weight percent, e.g., about 5 weight percent to about 13 weight percent. If desired, two different halogenated flame retardants may be added to the prepregs or the cores.

In some instances where the prepregs comprise a substantially halogen free flame retardant or a halogen free flame retardant, the flame retardant may be (or may comprise) one or more of N, P, As, Sb, Bi, S, Se, Te, F, Cl, Br, I, and At. In some embodiments, the non-halogenated flame retardant may comprise a phosphorated material so the prepregs and composite articles may be more environmentally friendly and comply with restrictions on hazardous substances (RoHS). Where substantially halogen free flame retardants are present, the flame retardant is desirably present in a flame retardant amount, which can vary depending on the other components which are present. For example, the substantially halogen free flame retardant may be present in about 0.1 weight percent to about 15 weight percent (based on the weight of the prepreg or core), more particularly about 1 weight percent to about 13 weight percent, e.g., about 5 weight percent to about 13 weight percent. If desired, two different substantially halogen free flame retardants may be added to the prepregs or the cores. In certain instances, the prepregs or core layers described herein may comprise one or more halogenated flame retardants in combination with one or more substantially halogen free flame retardants. Where two different flame retardants are present, the combination of the two flame retardants may be present in a flame retardant amount, which can vary depending on the other components which are present. For example, the total weight of flame retardants present may be about 0.1 weight percent to about 20 weight percent (based on the weight of the prepreg or core), more particularly about 1 weight percent to about 15 weight percent, e.g., about 2 weight percent to about 14 weight percent.

In some embodiments, the prepregs and cores may include additional materials or additives to impart desired physical or chemical properties. For example, one or more dyes, texturizing agents, colorants, viscosity modifiers, smoke suppressants, synergistic materials, lofting agents, particles, powders, biocidal agents, foams or other materials can be mixed with or added to the prepregs or the cores. In some instances, the prepregs or cores may comprise one or more smoke suppressant compositions in the amount of about 0.2 weight percent to about 10 weight percent. Illustrative smoke suppressant compositions include, but are not limited to, stannates, zinc borates, zinc molybdate, magnesium silicates, calcium zinc molybdate, calcium silicates, calcium hydroxides, and mixtures thereof. If desired, a synergist material can be present to enhance the physical properties of the prepregs or cores. For example, a synergist that enhances the repellent nature of the coating may be present. If desired, a synergist material that enhances flame retardancy may be present. Illustrative synergist materials include, but are not limited to, sodium trichlorobenzene sulfonate potassium, diphenyl sulfone-3-sulfonate, and mixtures thereof.

In other instances, the prepregs or cores described herein may comprise a thermosetting material in a desired amount, e.g., in a minor amount less than about 50 weight percent based on the total weight of the prepreg or core, to impart desired properties to the core. The thermosetting material may be mixed with the thermoplastic material or may be added as a coating on one or more surfaces of the prepregs or cores.

In certain embodiments, the prepregs or cores described herein may be porous, non-porous or includes areas which are porous while comprising other areas which are non-porous. The exact porosity present can vary depending on the intended use of the final article comprising the prepreg or core. In certain embodiments, the prepreg or core can comprise a porosity greater than 0% by volume, more particularly greater than 0% to about 95% by volume, and still more particularly about 30% to about 70% by volume. While not required, it is also possible that the overall composite, which is produced using the prepreg or core, is non-porous or has a porosity within the aforementioned ranges, e.g., the porosity of the composite may generally be greater than 0% to about 95% of the total volume of the composite, more particularly between greater than 0% to about 95% by the total volume of the composite, and still more particularly between about 30% to about 70% by the total volume of the composite. In yet other examples, the prepreg, core or the overall composite may comprise a porosity of 0-30%, 10-40%, 20-50%, 30-60%, 40-70%, 50-80%, 60-90%, 0-40%, 0-50%, 0-60%, 0-70%, 0-80%, 0-90%, 10-50%, 10-60%, 10-70%, 10-80%, 10-90%, 10-95%, 20-60%, 20-70%, 20-80%, 20-90%, 20-95%, 30-70%, 30-80%, 30-90%, 30-95%, 40-80%, 40-90%, 40-95%, 50-90%, 50-95%, 60-95% 70-80%, 70-90%, 70-95%, 80-90%, 80-95% or any illustrative value within these exemplary ranges. If desired the porosity of the prepreg, core or the overall composite may be greater than 95%, e.g., may be about 96% or 97%. In some instances, as porosity of the prepreg, core or composite increases, it may be desirable to use increased amounts of repellent material to decrease the absorption rate of any adhesive into the prepreg, core or composite. For example, to reduce the overall basis weight of the article, a core with a porosity of 95% or more can be used along with a repellent material present on the core surface to reduce absorption of fluid into the highly porous core.

In producing the prepregs and cores described herein, it may be desirable to use a wet-laid paper making process. For example, a liquid or fluid medium comprising dispersed material, e.g., thermoplastic materials and fibers optionally with any one or more additives described herein, may be stirred or agitated in the presence of a gas, e.g., air or other gas. The dispersion may then be laid onto a support, e.g., a wire screen or other support material, to provide a substantially uniform distribution of fibers over the laid down material. To increase fiber dispersion and/or uniformity, the stirred dispersion may comprise one or more active agents, e.g., anionic, cationic, or non-ionic such as, for example, those sold under the name ACE liquid by Industrial Soaps Ltd., that sold as TEXOFOR® FN 15 material, by Glover Chemicals Ltd., and those sold as AMINE Fb 19 material by Float-Ore Ltd. These agents can assist in dispersal of air in the liquid dispersion. The components can be added to a mixing tank, flotation cell or other suitable devices in the presence of air to provide the dispersion. While an aqueous dispersion is desirably used, one or more non-aqueous fluids may also be present to assist in dispersion, alter the viscosity of the fluid or otherwise impart a desired physical or chemical property to the dispersion or the prepreg, core or article.

In certain instances, after the dispersion has been mixed for a sufficient period, the fluid with the suspended materials can be disposed onto a screen, moving wire or other suitable support structure to provide a web of laid down material. Suction or reduced pressure may be provided to the web to remove any liquid from laid down material to leave behind the thermoplastic material and any other materials that are present, e.g., fibers, additives, etc. The resulting web can be dried, consolidated, pressed, lofted, laminated, sized or otherwise processed further to provide a desired prepreg, core or article. In some instances, the repellent material may be added to the web prior to drying, consolidation, pressing, lofting, laminating, sizing or other further processing to provide a desired prepreg, core or article. In other instances, the repellent material may be added to the web subsequent to drying, consolidation, pressing, lofting, laminating, sizing or other further processing to provide a desired prepreg, core or article. While wet laid processes may be used, depending on the nature of the thermoplastic material and other materials present, it may be desirable to instead use an air laid process, a dry blend process, a carding and needle process, or other known process that are employed for making non-woven products. In some instances, the repellent material is sprayed onto the surface of the prepreg or core after the prepreg or core has hardened to some degree by passing the board underneath a plurality of coating jets that are configured to spray the repellent material at about a ninety degree angle to the prepreg or core surface.

In certain configurations, the prepregs and cores described herein may be present without any repellent coating or material, and a substrate to be coupled to the prepregs or core may comprise a repellent material that is effective to reduce the absorption rate of the adhesive. The exact nature of the substrate may vary depending on the intended use of the formed article, but in some instances the substrate can be a thermoplastic film, an elastomeric film, a metal foil, a thermosetting coating, an inorganic coating, a fiber based scrim, a non-woven fabric, and a woven fabric. If desired, the substrate may comprise a limiting oxygen index greater than about 22, as measured per ISO 4589-2, first edition, 1996, to enhance at least one of the flame, smoke, heat release and gaseous emissions characteristics as described, for example, in commonly assigned U.S. Pat. No. 7,682,697. In some instances, it may be desirable to use a porous substrate so that the repellent material and/or any adhesive can penetrate into the pores (to at least some degree) and provide enhanced bonding between the prepreg or core and the substrate. As noted in more detail below, both the prepreg or core and the substrate may comprise a repellent material if desired.

In some embodiments, the resulting composite or board that comprises the prepreg or core may have a desired basis weight. For example, the overall basis weight of the resulting board may vary from about 200 gsm to about 3000 gsm, more particularly about 800 gsm to about 2000 gsm, for example about 900 gsm to about 1500 gsm. In some instances, the overall basis weight can be reduced when a repellent material is used as compared to when no repellent material is present, e.g., where a repellent material is present, the basis weight of the board can be reduced by 30%, 40%, 50% or more and still provide suitable physical properties In certain examples and referring to FIG. 1, a composite article comprising a base layer 110 (which may be a prepreg or core but for discussion purposes is referred to as a core below) with a substrate 130 disposed on the layer 110 is shown. For illustration purposes, a repellent layer 115 and an adhesive layer 120 is shown, though an actual layer may not be present but, instead, the materials may be sprayed on to form discontinuous areas of repellent and/or adhesive. The repellent material 115 is added to the core 110 prior to disposal of the adhesive 120 to repel the adhesive from being absorbed into the core, e.g., to reduce the absorption rate of adhesive into the core. The substrate 130 is then added onto the adhesive 120, and the article 100 may be cured to provide a final formed article. The core 110 may comprise one or more thermoplastic materials and reinforcing fibers as noted herein in connection with prepregs and core materials. The repellent material 115 may be any one or more of the repellent materials described herein. The substrate 130 may be any of those substrates described herein, e.g., a thermoplastic film, an elastomeric film, a metal foil, a thermosetting coating, an inorganic coating, a fiber based scrim, a non-woven fabric, and a woven fabric The adhesive 120 may comprise suitable adhesives including, but not limited to, hot melt adhesives, thermoplastic adhesives, thermoset adhesives or other suitable adhesives such as, for example, polyolefin adhesives, ethylene-vinyl acetate based adhesives, polyamide adhesives, polyester adhesives, polyurethane adhesives, thermoplastic polyurethane adhesives, styrene block copolymer adhesives, polycarbonate adhesives, fluoropolymeric adhesives, silicone adhesives, silicone rubber adhesives, elastomeric adhesives, pyrrole adhesives or other suitable adhesives. The adhesive may be present in many different forms including, liquid and solid forms, resin form, rosin form or other forms and may optionally contain additives such as waxes, plasticizers, antioxidants, flame retardants, UV stabilizers, dyes, colorants, pigments, biocidal agents, antistatic agents, fillers, particles, powders, whiskers, fibers or other desired additives. The adhesive, for example, may be water based or may be oil based. In some instances, the adhesive used may be "thin" or substantially non-viscous, e.g., may flow at room temperature. The presence of a repellent permits the use of liquid based adhesives with good retention on the surfaces of the various components of the articles prior to curing or processing.

Figure 2A:
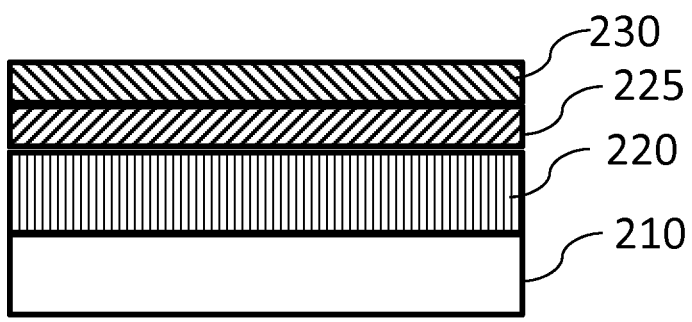
FIG. 2A is an illustration of an article comprising a prepreg or core and a substrate comprising a repellent material and optionally an adhesive, in accordance with certain configurations.
Figure 2B:
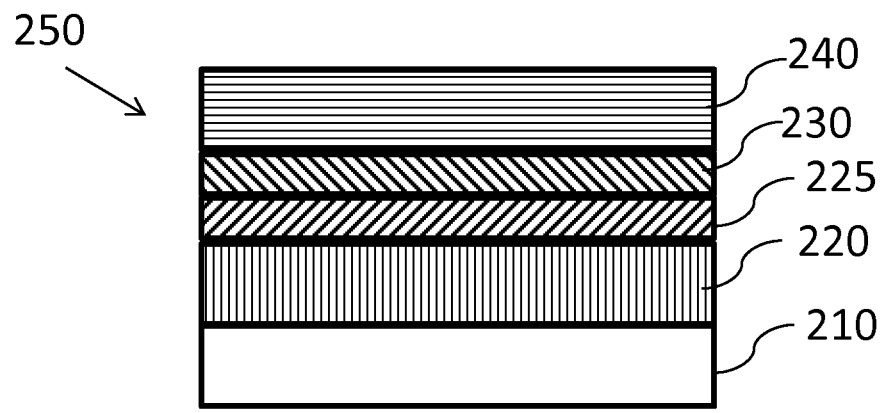
FIG. 2B is an illustration of an article comprising a prepreg or core and a substrate comprising a repellent material and optionally an adhesive and further including a second substrate disposed on the substrate, in accordance with certain configurations.

In certain configurations, it may be desirable to add another substrate to the substrate coupled to the prepreg or core. Referring to FIG. 2A, an article 200 is shown comprising a prepreg or core 210 coupled to a substrate 220. In the article 200, no adhesive or repellent coating is present between the core 210 and the substrate 220, but if desired, one or more of an adhesive and/or repellent may be used. For example, the thermoplastic material of the core 210 may be softened or melted to couple the substrate 220 to the core 210. The substrate 220 comprises a repellent coating 225 on a surface or some portions thereof. An adhesive 230 (or other fluid material) is disposed on the repellent 225, which is effective to retain a substantial amount, e.g., greater than 50%, 60%, 70%, 80% or 90% of the disposed adhesive, on the surface of the substrate 220. If desired, another substrate 240 may be coupled to the substrate 220 through the adhesive 230 (as shown in FIG. 2B) to provide an article 250. The substrates 220, 250 may be the same or may be different. In some instances, additional repellent and adhesive may be disposed on the substrate 250 to permit addition of another substrate on the article 250. In this manner, a desired number of substrate layers may be added to a prepreg or core layer to provide a final article.

Figure 3A:
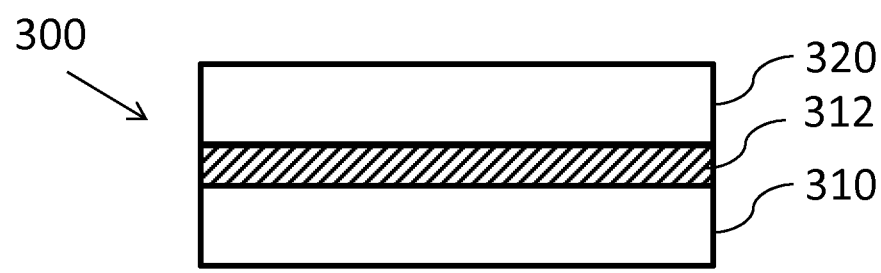
FIG. 3A is an illustration of an article comprising two prepreg or core layers coupled to each other using a repellent material, in accordance with certain configurations.
Figure 3B:
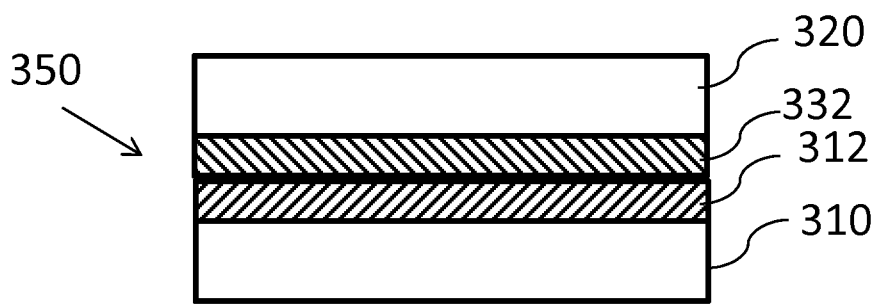
FIG. 3B is an illustration of an article comprising two prepreg or core layers coupled to each other using a repellent material and an adhesive, in accordance with certain configurations.

In some instances, it may be desirable to couple two or more prepreg or core layers to increase the overall thickness of the article. For example and referring to FIG. 3A, an article 300 comprising prepreg or core layers 310, 320 is shown. The core layers 310, 320 are coupled to each other through a repellent layer 312. The repellent layer 312 may be effective to reduce the flow rate of the thermoplastic material in each of the layers 310, 320. This reduction can result in better adhesion of the two thermoplastic layers 310, 320 to each other in the article 300. If desired, one or more adhesives may be present between prepreg or core layers 310, 320. For example and referring to FIG. 3B, an adhesive layer 332 is shown as being disposed on a repellent layer 312. The repellent layer 312 is effective to retain substantially more adhesive of the adhesive layer 332 on the surface of the core 310 to permit enhanced bonding of the core 310 to the core 320. Additional prepreg or core layers may be coupled to the articles 300 or 350 to increase the overall thickness and number of prepreg or core layers present in a final article.

Figure 4:
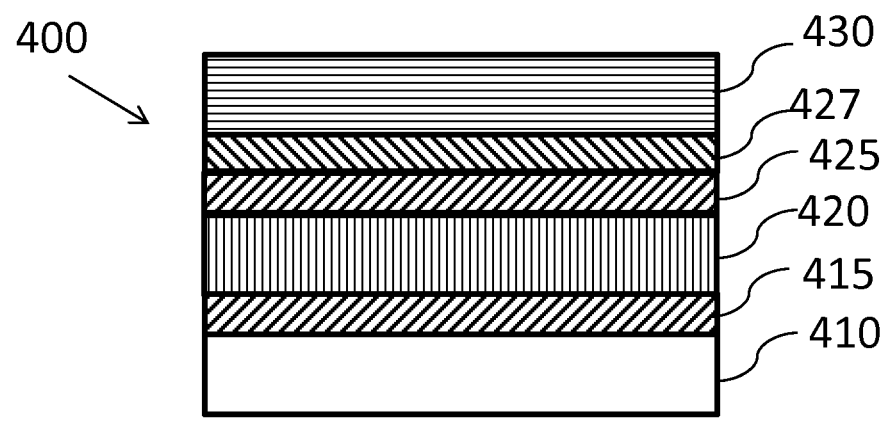
FIG. 4 is an illustration of an article comprising two or more substrates, in accordance with certain configurations.

In certain configurations, it may be desirable to include a repellent layer or coating between each of the different components present in an article. Referring to FIG. 4, an article 400 is shown comprising a prepreg or core 410 coupled to a substrate 420 through a repellent layer 415. The substrate 420 is coupled to an additional substrate 430 through a repellent layer 425 and an adhesive layer 427. Additional substrates may be coupled to the substrate 420 using additional repellent layers and/or adhesive layers. In some instances, 2, 3, 4, 5 or more additional substrates may be coupled to the substrate 420.

Figure 5:
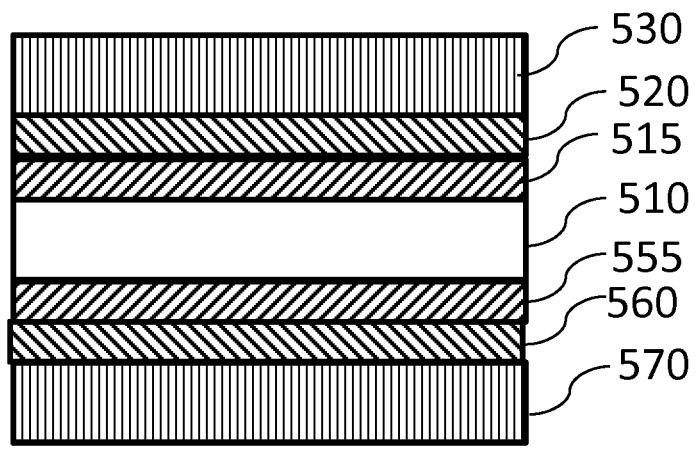
FIG. 5 is an illustration of an article comprising a substrate on more than one surface of a prepreg or core layer, in accordance with certain configurations.

In some configurations, one or more substrates may be coupled to each side of a prepreg or core layer. Referring to FIG. 5, a composite article 500 comprising a base layer 510 (which may be a prepreg or core but for discussion purposes is referred to as a core below) with a substrate 530 disposed on the layer 510 is shown. For illustration purposes, a repellent layer 515 and an adhesive layer 520 are shown, though an actual layer may not be present but, instead, the materials may be sprayed on to form discontinuous areas of repellent and/or adhesive. The repellent material 515 is added to the core 510 prior to disposal of the adhesive 520 to repel the adhesive from being absorbed into the core, e.g., to reduce the absorption rate of adhesive into the core. The substrate 540 is then added onto the adhesive 520. On the other side of the core 510 a repellent layer 555 is added followed by an adhesive layer 560. An additional substrate 570 is added on the adhesive layer 560. While the substrate 570 is shown as being coupled to the core 510 through layers 555, 560, if desired, the layers 555, 560 may be omitted and the substrate 570 may be directly coupled to the core 550 without the use of any adhesive or repellent material. The article 500 may be cured to provide a final formed article. The core 510 may comprise one or more thermoplastic materials and reinforcing fibers as noted herein in connection with prepregs and core materials. The repellent materials 515, 555 may be any one or more of the repellent materials described herein and may be the same or may be different. The substrates 530, 570 may be any of those substrates described herein, e.g., a thermoplastic film, an elastomeric film, a metal foil, a thermosetting coating, an inorganic coating, a fiber based scrim, a non-woven fabric, and a woven fabric and may be the same or may be different. The adhesive layers 520, 560 may comprise suitable adhesives including, but not limited to, hot melt adhesives, thermoplastic adhesives, thermoset adhesives or other suitable adhesives such as, for example, polyolefin adhesives, ethylene-vinyl acetate based adhesives, polyamide adhesives, polyester adhesives, polyurethane adhesives, thermoplastic polyurethane adhesives, styrene block copolymer adhesives, polycarbonate adhesives, fluoropolymeric adhesives, silicone adhesives, silicone rubber adhesives, elastomeric adhesives, pyrrole adhesives or other suitable adhesives. The adhesive layers 520, 560 may be the same or may be different. The adhesive may be present in many different forms including, liquid and solid forms, resin form, rosin form or other forms and may optionally contain additives such as waxes, plasticizers, antioxidants, flame retardants, UV stabilizers, dyes, colorants, pigments, biocidal agents, antistatic agents, fillers, particles, powders, whiskers, fibers or other desired additives. In some instances, the adhesive used may be "thin" or substantially non-viscous, e.g., may flow at room temperature. The adhesives in the layers 520, 560 may independently be water based adhesives or oil based adhesives. In some instances, one of the layers 520, 560 comprises a water based adhesive and the other layer comprises an oil based adhesive. In other instances, each of the layers 520, 560 may be a water based adhesive or an oil based adhesive. The presence of a repellent permits the use of liquid based adhesives with good retention on the surfaces of the various components of the articles prior to curing or processing. If desired, different amounts of repellent material and/or adhesive may be used on each side of the core 510.

Figure 6A:
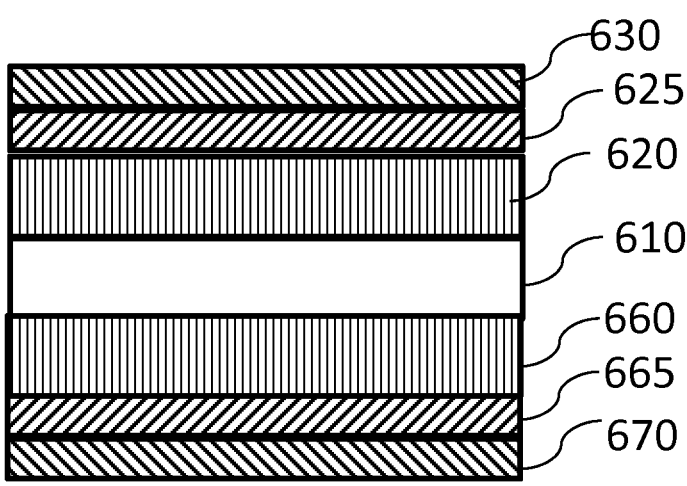
FIG. 6A is an illustration of an article comprising a prepreg or core and a substrate comprising, on a least two surfaces, a repellent material and optionally an adhesive, in accordance with certain configurations.
Figure 6B:
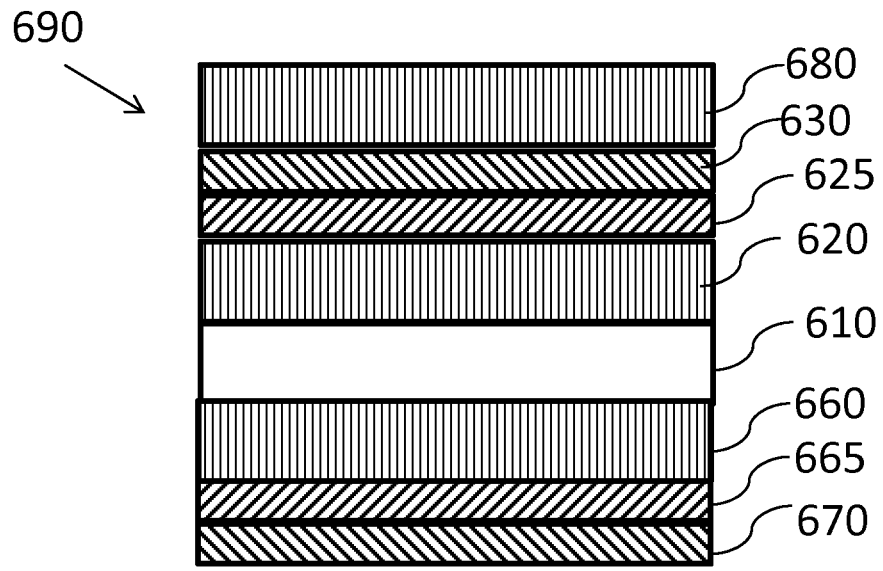
FIG. 6B is an illustration of an article comprising a prepreg or core and, on each surface, a substrate comprising a repellent material and optionally an adhesive and further including a second substrate disposed on one of the other substrates, in accordance with certain configurations.

In certain configurations, it may be desirable to add another substrate to the substrate coupled to the prepreg or core. Referring to FIG. 6A, an article 600 is shown comprising a prepreg or core 610 coupled to a substrate 620. In the article 600, no adhesive or repellent coating is present between the core 610 and the substrate 620, but if desired, one or more of an adhesive and/or repellent may be used. For example, the thermoplastic material of the core 610 may be softened or melted to couple the substrate 620 to the core 610. A second substrate 660 is disposed on another surface of the core 610. Each of the substrates 620, 660 comprises a repellent coating 625, 665, respectively, on a surface or some portions thereof. Adhesive layers 630, 670 are disposed on the repellent layers 625, 665, respectively. The exact amount of repellent material and adhesive material used can vary and may vary between the different layers, 625, 630, 665, 670. In some instances, enough repellent material is present on each of the substrates 620, 660 to be effective to retain a substantial amount, e.g., greater than 50%, 60%, 70%, 80% or 90% of the disposed adhesive, on the surface of the substrates 620, 660. If desired, another substrate 680 may be coupled to the substrate 620 through the adhesive 630 (as shown in FIG. 6B) to provide an article 690. The substrates 620, 660 and 680 may be the same or may be different. In some instances, additional repellent and adhesive may be disposed on the substrate 680 to permit addition of another substrate on the substrate 680. In this manner, a desired number substrate layers may be added to a prepreg or core layer to provide a final article.

Figure 7:
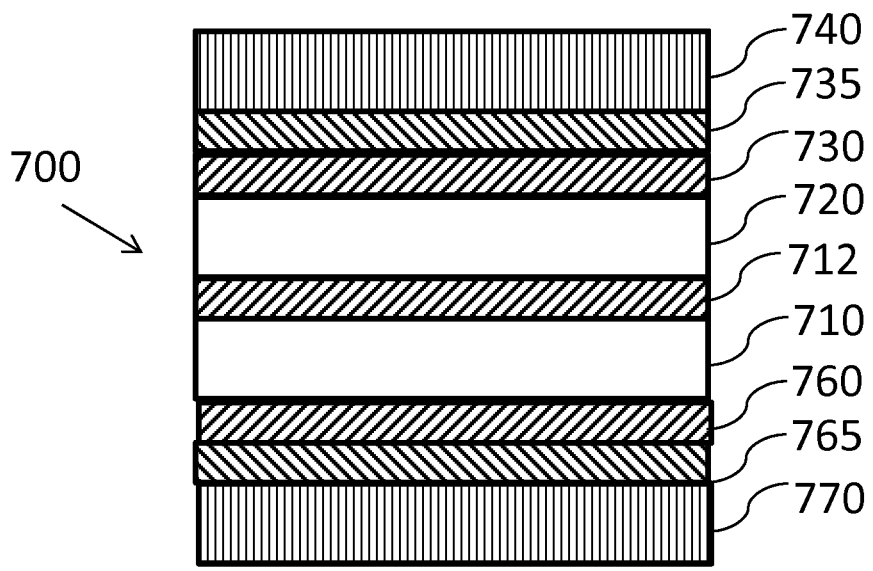
FIG. 7 is an illustration of an article comprising a plurality of prepreg or core layers and a plurality of substrate layers, in accordance with certain configurations.

In some instances, it may be desirable to couple two or more prepreg or core layers to increase the overall thickness of the article. For example and referring to FIG. 7, an article 700 comprising prepreg or core layers 710, 720 is shown. The core layers 310, 320 are coupled to each other through a repellent layer 712. The repellent layer 712 may be effective to reduce the flow rate of the thermoplastic material in each of the layers 710, 720. This reduction can result in better adhesion of the two thermoplastic layers 710, 720 to each other in the article 700. In some instances, the repellent layer 712 can be omitted and the cores 710, 720 can be directly stacked onto each other without any intervening repellent material. If desired, one or more adhesives may be present between prepreg or core layers 710, 720. For example, an adhesive layer may be present and disposed on the repellent layer 712 if desired. On the other surface of the core layer 710 is a repellent layer 760 and an adhesive layer 765, which are used to couple a substrate 770 to the core layer 710. Additional prepreg or core layers may be coupled to the article 700 to increase the overall thickness and number of prepreg or core layers present in a final article.

Figure 8:
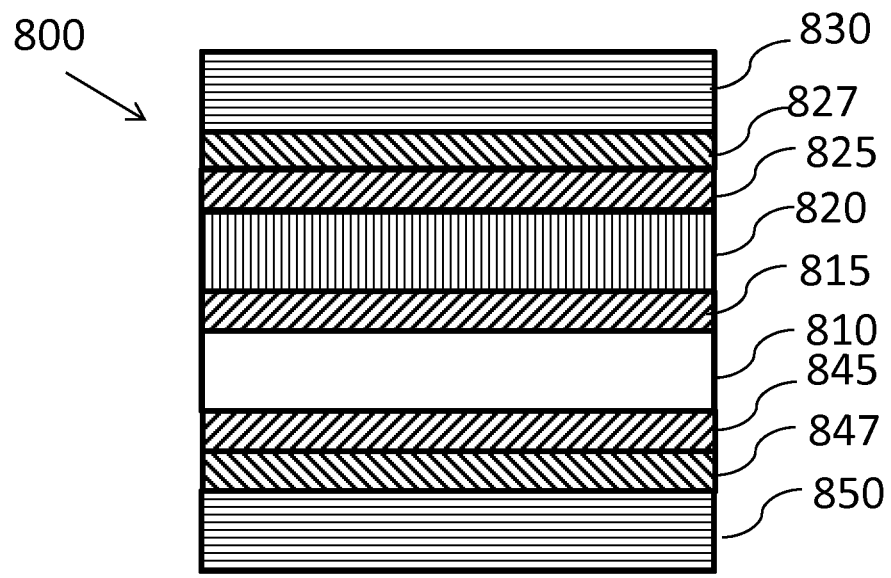
FIG. 8 is an illustration of an article comprising a prepreg and a plurality of substrates, in accordance with certain configurations.

In certain configurations, it may be desirable to include a repellent layer or coating between each of the different components present in an article comprising a plurality of substrates. Referring to FIG. 8, an article 800 is shown comprising a prepreg or core 810 coupled to a substrate 820 through a repellent layer 815. The substrate 820 is coupled to an additional substrate 830 through a repellent layer 825 and an adhesive layer 827. Additional substrates may be coupled to the substrate 820 using additional repellent layers and/or adhesive layers. In some instances, 2, 3, 4, 5 or more additional substrates may be coupled to the substrate 820. The article 800 also comprises another substrate 850 coupled to another surface of the prepreg or core 810 through a repellent layer 845 and an adhesive layer 847.

Figure 9:
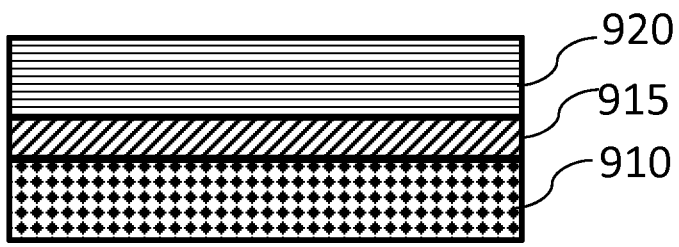
FIG. 9 is an illustration of two substrates coupled to each other through a repellent layer, in accordance with certain examples.

In some instances, it may be desirable to couple two or more substrates using a repellent material to enhance bonding between the substrates. Referring to FIG. 9, a first substrate 910 is coupled to a second substrate 920 through a repellent material 915. As noted in connection with FIGS. 1-8, the repellent material 915 may not actually be present as a layer but instead may be sprayed, coated or otherwise disposed on one or both of the substrates 910, 920. The repellent material 915 may be effective to reduce the level at which the two substrates "melt" into each other. This effect may permit alteration of processing conditions to provide a tighter bond between the substrates. While not shown, an adhesive material may be disposed on the substrates prior to coupling to each other to further enhance coupling of two substrates 910, 920.

In some embodiments, the fiber orientation in one of the substrates 910, 920 may be different from the fiber orientation in the other substrate. For example, the fibers in the substrate 920 may be oriented in the machine direction, e.g., at 0 degrees, and the fibers in the substrate 910 may be oriented in the cross direction, e.g., at 90 degrees to provide a bidirectional fiber orientation, e.g., 0/90 fibers. Other angles, e.g., 45 degrees, 60 degrees, 75 degrees, etc. are also possible. In addition, the fibers in the two substrates 910, 920 may be oriented in the same direction or angle if desired. In articles comprising two or more substrates on two or more surfaces of a prepreg or core layer, the substrates on each surface may provide a bi-directional orientation or other desired fiber orientation. In producing such articles, a first tape or roll of material comprising fibers oriented in one direction may be placed on a core layer comprising a repellent material and optionally an adhesive material. The article may then be cured if desired. Alternatively, a repellent material and optionally an adhesive may be disposed on the first tape, and a second tape or roll of material comprising fibers oriented in a selected direction may be disposed on the repellent material and/or adhesive material. The article may then be cured to provide a final article comprising a selected fiber orientation in the different tape layers. In some embodiments, a single tape comprising 0/90 fibers in one layer may be disposed on a prepreg or core followed by application of a repellent treatment to the disposed tape.

In some embodiments, the fibers of the tapes or rolls of material may be treated with a repellent material prior to formation of the tape. For example, fibers may be coated or sprayed with a repellent material and then can be embedded in a thermoplastic material to provide a tape comprising thermoplastic material in combination with the repellent treated fibers. If desired, each tape used may comprise repellent treated fibers or one of the tapes may comprise repellent treated fibers.

In some embodiments, the substrates which can be added to the prepregs and cores described herein may take many forms including, but not limited to, films, frims (woven or non-woven), scrims (woven or non-woven), foils, fabrics (woven or non-woven) or other suitable materials. Where a fiber based scrim is used, the scrim may comprise one or more of glass fibers, aramid fibers, graphite fibers, carbon fibers, inorganic mineral fibers, metal fibers, metalized synthetic fibers, a metallized inorganic fibers, polyacrylonitrile, p-aramid, m-aramid, poly(p-phenylene2,6,benzobisoxazole), poly(ether-imide), poly(phenylene sulfide), polyethyleneterephthalate, polybutyleneterephthalate, polybutylenetetrachlorate, and polyvinyl chloride. Where the substrate takes the form of a film, the film may comprise one or more of poly(ether imide), poly(ether ketone), poly(ether-ether ketone), poly(phenylene sulfide), poly(arylene sulfone), poly(ether sulfone), poly(amide-imide), poly(1,4-phenylene), polycarbonate, nylon, and silicone. The substrate may also comprise unsaturated polyurethanes, vinyl esters, phenolics, epoxies, gypsum, calcium carbonate, mortar, minerals containing cations selected from Ca, Mg, Ba, Si, Zn, Ti and Al and other metal species.

In some instances, the thermoplastic composite articles described above can be used in, but not limited to, building infrastructure, building products (e.g., boards, window frames, drywall substitutes, interior or exterior wall panels, roof underlayments, floor underlayments, backer board, etc.), aircraft, train and naval vessel side wall panels, ceiling panels, cargo liners, office partitions, elevator shaft lining, ceiling tiles, recessed housing for light fixtures and other such applications that are currently made with honeycomb sandwich structures, thermoplastic sheets, and flame retardant panels. The composite sheets can be molded into various articles using methods known in the art including, for example, pressure forming, thermal forming, thermal stamping, vacuum forming, compression forming, and autoclaving. The combination of high stiffness to weight ratio, ability to be thermoformed with deep draw sections (if desired), end of life recyclability, acoustics and desirable low flame spread index, heat release, smoke density and gas emission properties make the porous fiber-reinforced thermoplastic composite a more desirable product than the products currently being used. Particularly desirable applications of the articles find use in recreational vehicles and other vehicles as the repellent coating can reduce the overall weight of the articles while still permitting retention of binding strength and/or resistance to delamination. Other desirable uses are those where high moisture or high humidity environments are encountered as the repellent coated articles are effective at preventing water absorption. For example, the articles can be used as backer boards for shower panels or as underlayments for flooring or roofing as the repellent material on the boards acts to deter water absorption. In some instances, the boards are anti-fungal and/or anti-bacterial as the boards can be designed to include materials that do not support fungal or bacterial growth. For example, where the boards comprise a polyolefin thermoplastic core and glass reinforcing fibers along with a perfluoro repellent material treatment, mold growth is generally not supported. In addition, the temperature insensitive nature of articles described herein provides for easier assembly of panels and products without the adverse temperature variability processing commonly encountered with existing articles. The use of lighter weight panels reduces overall cost, increases fuel efficiency and permits the use of less expensive and complicated assembly equipment.

In some embodiments, the articles described herein may be more susceptible to bending while retaining desired performance characteristics. The enhanced resistance to delamination may permit bending of the articles to provide rounded shapes, e.g., rounded corners, rounded noses or other rounded features. In some instances, the articles provided herein may be formed into a generally solid body and then desired areas may be cut out or rounded out. For example, a wall board may be formed and spaces for windows may be routed out without any substantial delamination of the various components which are coupled to each other. In other instances, a wall board may be formed and bent to provide a circular shower shape without any hard corners as such shapes may be more aesthetically desirable and the lack of any joints in the board reduces the likelihood of water penetration behind the board.

In certain embodiments, the articles described herein may comprise a repellent material to provide a repellency grade number of 3 or higher as tested by the ISO 23232 test method dated 2009. The ISO 23232 test method can be used to determine the ability of a fluid, e.g., water or water/alcohol mixtures, to be retained on a surface of a material. The higher the repellency grade number, the more resistant the board generally is to fluid absorption.

Figure 10:
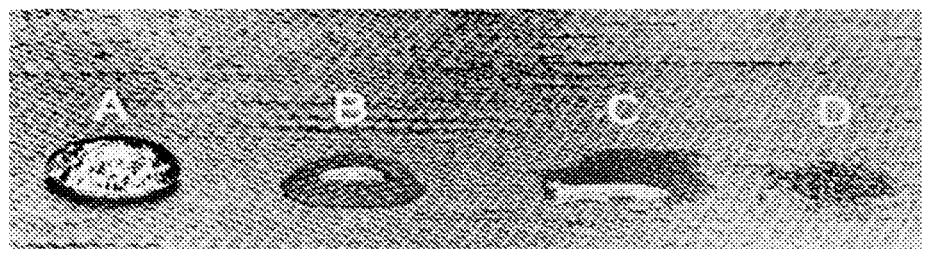
FIG. 10 is a photograph showing four different drop shapes (A-D) in accordance with certain examples.

In using the ISO 23232 test method, test liquids are added to the surface of a material at a volume of about 0.05 mL in three different locations (usually about 4 cm apart). The drops are added at a height of about 0.6 cm above the surface. The drop is observed for about 10 seconds for penetration. The drop shape is compared to the shapes in FIG. 10. It is desirable that the drop shape resembles the "A" or "B" shape as drops with the "C" shape and the "D" shape represent penetration into the article. If no penetration occurs, e.g., the drops have the "A" shape or the "B" shape in FIG. 10, then the next grade liquid is added as shown in Table 1 below.

TABLE 1

| Aqueous Solution Repellency Grade Number | Solution Composition Water:Isopropanol (by volume) | Surface Tension at 25 deg. C. (dyn/cm) |
|---|---|---|
| 0 | 100:0 | 72.0 |
| 1 | 98:2 | 59.0 |
| 2 | 95:5 | 50.0 |
| 3 | 90:10 | 42.0 |
| 4 | 80:20 | 33.0 |
| 5 | 70:30 | 27.5 |
| 6 | 60:40 | 25.4 |
| 7 | 50:50 | 24.5 |
| 8 | 40:60 | 24.0 |

This process is repeated from solution 0 to solution 8 until penetration (if any) is observed. For example, if penetration is observed with solution 4, then the surface would be considered to have a repellency grade of 3 under the ISO 23232 test method. If penetration is observed with solution 7, then the surface would be considered to have a repellency grade of 6 under the ISO 23232 test method.

In other instances, the prepregs, cores and articles described herein may include a repellent treatment effective to retain a fluid on its surface for at least 5 minutes as tested using the same procedure outlined in the ISO 23232 test method. This test is referred to in certain instances as the "5-minute modified ISO 23232 test method." For example, if the board is rated a repellency grade of 3 under the 5-minute modified ISO 23232 test method, then droplets of solution #3 in Table 1 above, when added to the surface of the board using the ISO 23232 test method, are retained on the surface (in the "A" or "B" shape) for at least 5 minutes.

Figure 11:
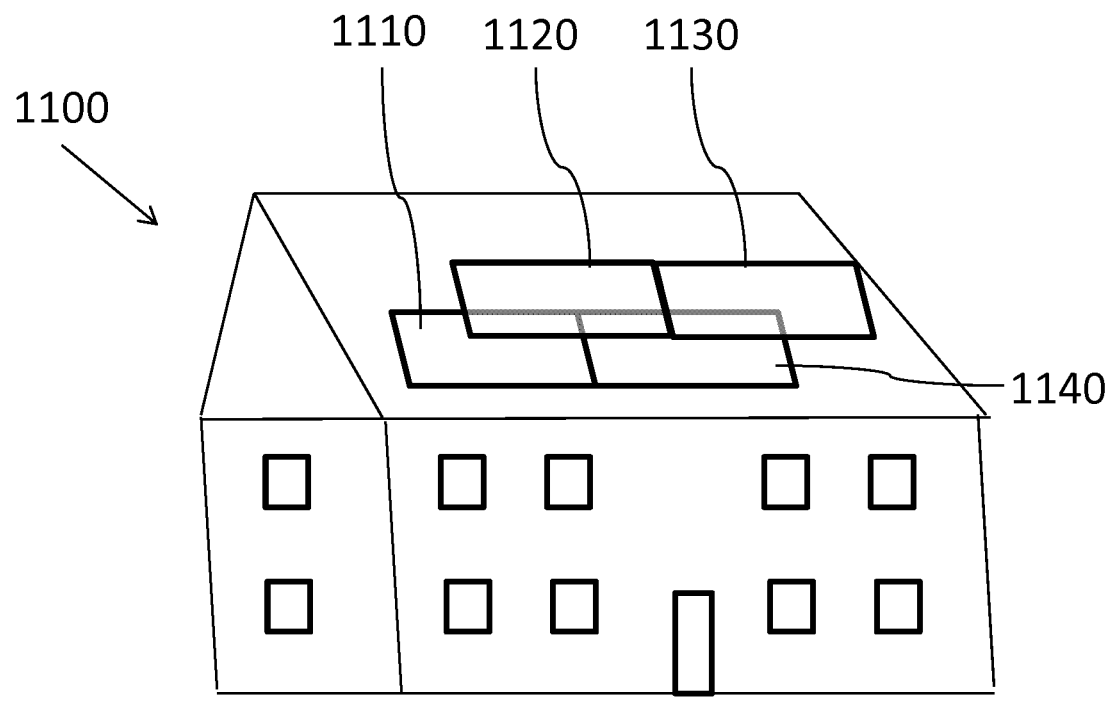
FIG. 11 is an illustration of a house comprising roof underlayment panels, in accordance with certain configurations.

In certain embodiments, the prepregs, cores and composite articles described herein can be used as a floor underlayment or a roof underlayment. Referring to FIG. 11, an illustration of a house 1100 showing a roof surface comprising core layers as described herein is shown. The cores can be installed as panels 1110-1140 with overlapping joints. Each panel may be, for example, about 4 feet by about 8 feet and about 2-4 mm in thickness. The panels can be adhered, nailed or otherwise attached to the underlying roof surface and then covered with asphalt shingles or other suitable roofing materials, e.g., aluminum, clay tiles, slate, etc. Instead of installing individual panels, a bolt of material comprising the core can be used to drape a continuous sheet of core layer across the roof surface. Additional core layer runs can be pulled across the first run in a similar manner as existing roofing underlayments, e.g., tar paper, used in roofing applications. The core layers, if desired, can be directly attached to the back of asphalt shingles (or other roofing materials such as aluminum or tiles) to speed up installation of the roofing materials. In some instances, the materials of the core layers are selected so that they will soften (to a small degree) in their use environment. Softening can permit different core layers to "melt" into each other and form a generally continuous barrier under the roofing materials. This barrier, due to its repellent nature from the presence of a repellent material, can prevent water from reaching underlying sheathing. It is a desirable attribute that the core layers, when used as roofing underlayments, can act as water/ice barriers and reduce the likelihood of subsurface penetration by water.

Similar to the use of the materials as roofing underlayments, the core layers can be added as a floor underlayment to reduce noise, dampen vibrations and provide some insulation. For example, the porous open cell structure of the core layers can act as an effective insulator between flooring materials and any underlying sub-floor. This insulative effect can reduce heat transfer/loss and can decrease the passage of sound from one floor of a building to another floor of a building.

Figure 12:
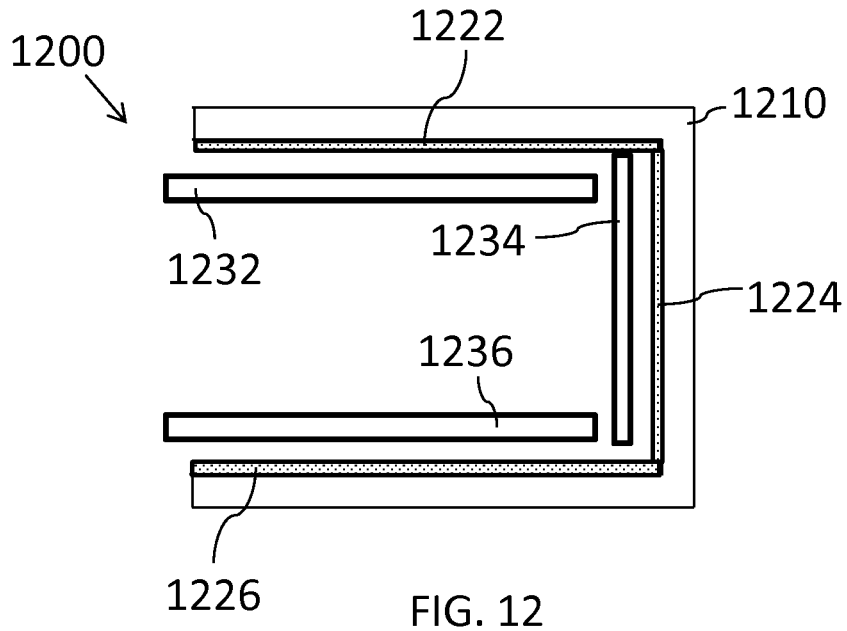
FIG. 12 is an illustration of a shower stall, in accordance with certain examples.

In certain instances, the prepregs or cores described herein can be used in surface applications in environments exposed to high moisture. Illustrative applications include using the prepregs, cores and articles as back boards for tile, for shower panels and other areas of bathrooms, kitchens or rooms where high moisture may be experience continuously or intermittently. Referring to FIG. 12, a top view of a shower stall 1200 is shown. The shower stall comprises panels 1232, 1234 and 1236 which may be acrylic or other materials, or in alternative designs, various tile materials can be used instead. A base structure 1210, e.g., studs, concrete block or other members, is present and attached to prepregs or cores (or composite articles) 1222, 1224 and 1226 which comprise a repellent treatment as described herein. The presence of the repellent treatment on the panels 1222, 1224 and 1226 permits the use of less adhesive to attach the panels 1232, 1234 and 1236. In addition, the water repellent nature of the panels 1222, 1224 and 1226 acts to deter moisture penetration to the underlying base structure 1210. While the shower stall 1200 is shown as having various corners, the bendability of the prepregs and cores can permit construction of a rounded shower stall with a single continuous panel comprising the prepregs or cores and a single overlying panel or acrylic or other materials.

Figure 13:
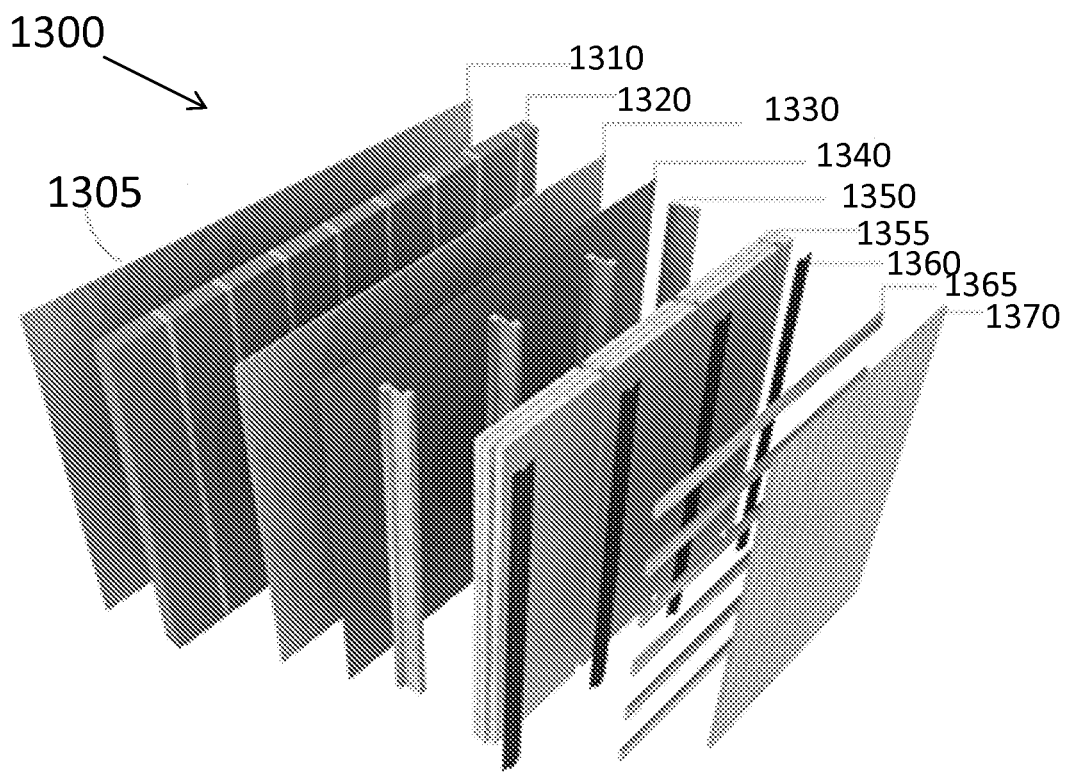
FIG. 13 is an illustration of some components which can be used in building applications, in accordance with certain examples.

In certain configurations, the prepregs, cores and articles described herein can be used as exterior sheathing, interior sheathing or exterior or interior wall applications. For example, the cores can replace exterior plywood or OSB sheathing and provide greater resistance to water penetration that traditional wood substrate materials. In other instances, the cores can be used in place of plaster board or gypsum board. Paint or other surface coatings such as stucco, plaster and the like can be added directly to the core to provide a finished surface. Referring to FIG. 13, an illustration of various components that can be used in finishing a wall structure are shown. The wall structure 1300 comprises an interior surface 1305 and an exterior surface 1370. The interior surface coating 1305 can take many forms including paint, plaster, stucco, etc. The interior coating 1305 can be disposed on a board 1310 such as drywall, backer board, greenboard or one or the prepregs, cores or composite articles described herein, e.g., one with a repellent material. Adjacent to the inner layer 1310 is an insulation layer 1210, which typically takes the form of cellulose, fiberglass, isocyanate or other insulation materials. A layer 1330 is adjacent to the insulation layer 1320. The layer 1330 may comprise a prepreg, core or composite article with a repellent material. A vapor barrier 1340 underlies the layer 1330 and is positioned adjacent to woods studs 1350, e.g., is stapled to the wood studs 1350. If desired, additional insulation can be placed between the studs 1350, e.g., fiberglass batt insulation may be placed between the studs. On the outside of the building, another insulation layer 1355 can be present. If desired, an additional vapor barrier 1360, e.g., in the form or a sheet or tape, can be placed on the insulation layer 1355. An optional horizontal rain screen 1365 can be present between the vapor barrier 1360 and exterior sheathing or siding 1370. Where the sheathing or siding 1370 is to be covered by an additional material, e.g., brick, vinyl siding, aluminum siding, etc., the sheathing may be one or more of the prepregs described herein to deter entry of water into other components of the wall system 1300. It will be recognized by the person of ordinary skill in the art, given the benefit of this disclosure, that not all components of the wall system 1300 need be present. For example, a wall system comprising a first core layer attached to wood studs or concrete block on the inside of the structure, and a second core layer attached to the wood studs or concrete block on the outside of the structure can be implemented. The second core layer can be covered with a vapor barrier and siding to prevent moisture from penetrating the wall assembly. Other configurations using one or more core layers in a wall or building assembly will be recognized by the person of ordinary skill in the art, given the benefit of this disclosure.

In some instances, the prepregs or cores described herein can be laminated to each other to provide a structural member such as a stud, joist, truss or other weight bearing or structural members present in a building. Various different open porous cores can be laminated or otherwise joined to each other, e.g., using an adhesive or other materials, and can be sized to provide a suitable dimension, e.g., can be sized and used as a dimensional wall stud or used in construction of engineered trusses. In some instances, the prepregs or cores can be laminated or sealed to existing wood studs or trusses (or other structural members) to seal them from the external environment and/or provide additional weight bearing support. Additional applications where the prepregs and cores with a repellent treatment are used as structural members will be recognized by the person of ordinary skill in the art, given the benefit of this disclosure.

In certain configurations, the prepregs, core layers and composite articles with repellent materials as described herein can be used for anti-fungal and/or anti-bacterial applications. For example, the materials can be used in kitchen or bathroom countertops, as structural support materials for sinks or toilets, as wall boards in clean rooms or forensic facilities, in settings for growing microbiological organisms and in other settings where it is desired to prevent or deter fungal or bacterial growth. The prepregs and cores can desirably be used where mold is likely to occur. As at least some configurations of the prepregs and cores do not include any materials which support mold growth, the prepregs and cores can provide some mold resistance without the need to add any fungicide or other biocidal agents. The ability to deter mold growth without the addition of antifungal agents to the prepregs or cores is a substantial attribute of the prepregs and cores described herein.

Certain specific examples are described below to illustrate further some of the novel aspects and uses of the technology described herein.

Example 1

A 25 gsm scrim, e.g., an aramid or PET scrim, can be coupled to a thermoplastic core layer comprising polypropylene and glass fibers. A repellent treatment, e.g., perfluoro material treatment or other repellent material treatment, may be provided on the 25 gsm scrim prior to coupling to the core layer to permit use of the lighter weight scrim while still providing desired adhesion between the core layer and the scrim. The overall basis weight of the resulting board may vary from about 800 gsm to about 1200 gsm.

Example 2

An article can be produced comprising a thermoplastic core comprising a thermoplastic material and reinforcing fibers. The article may also include a scrim or other substrate coupled to the core. A repellent treatment, e.g., perfluoro material treatment or other repellent material treatment. may be provided to the core of the substrate (or both), and the article may be coupled to a structural interior component, e.g., foam or metal reinforced foam, to provide a wall panel suitable for use in recreational vehicles, as wall cubicles or other uses. One or more decorative skins may be added to the surfaces of the panel to provide for enhanced aesthetics. Skins exposed to weather may comprise, for example, a fiberglass reinforced polyethylene resin which is generally seamless. Skins on the interior may comprise, for example, a decorative paper or other material.

Example 3

Liquid urethane was disposed on a scrim surface of an article comprising a fiber-reinforced thermoplastic core (polypropylene and glass fibers with an overall basis weight of about 1100 gsm) and a 20 gsm polyethyleneterephthalate scrim coated with a repellent. Adhesive was disposed at a rate of 17 grams per square foot.

Figures 14A, 14B:
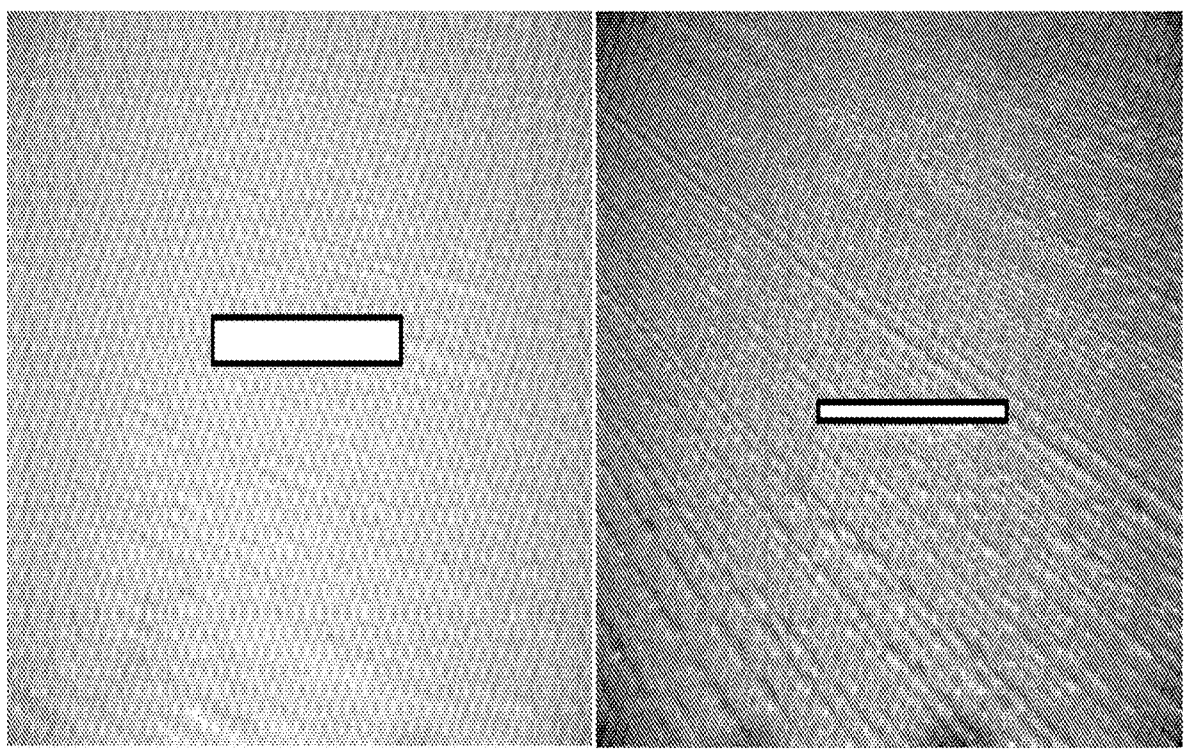
FIGS. 14A and 14B are photographs of boards treated with a repellent to demonstrate adhesive bead formation, in accordance with certain configurations.

As shown in FIGS. 14A and 14B, the liquid urethane remained almost entirely on the surface of the repellent treated porous composite (FIG. 14B) and formed a plurality of liquid urethane beads across the span of the surface. The white bars present in FIGS. 14A and 14B mask an internal label used on the boards.

Figure 15A:
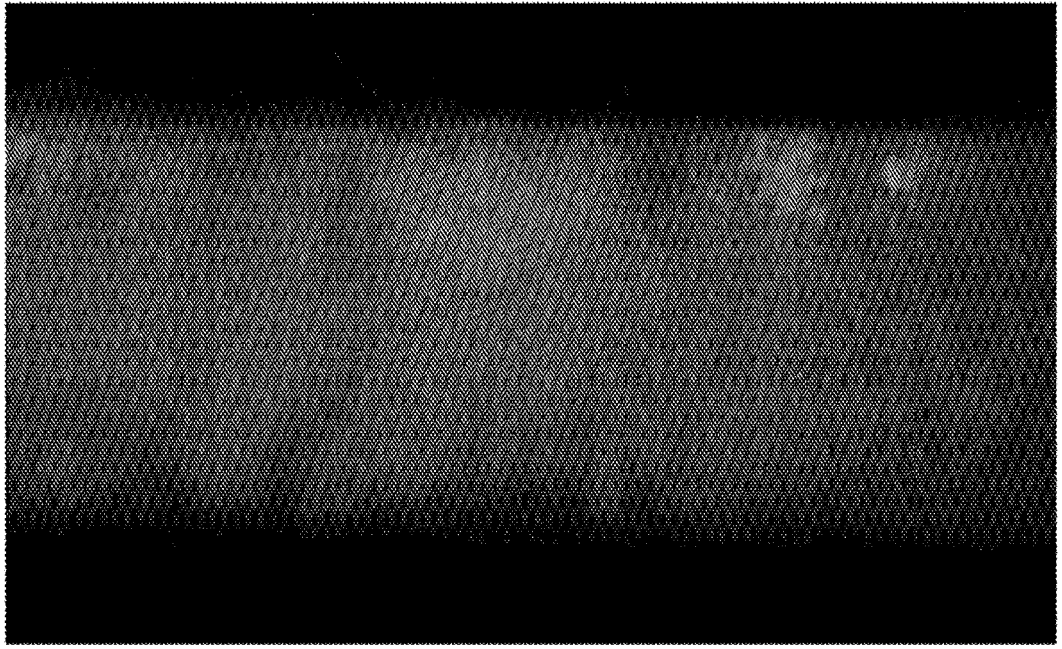
FIGS. 15A and 15B are microscope images of the boards of FIGS. 14A and 14B showing adhesive bead formation on repellent treated boards, in accordance with certain configurations.
Figure 15B:
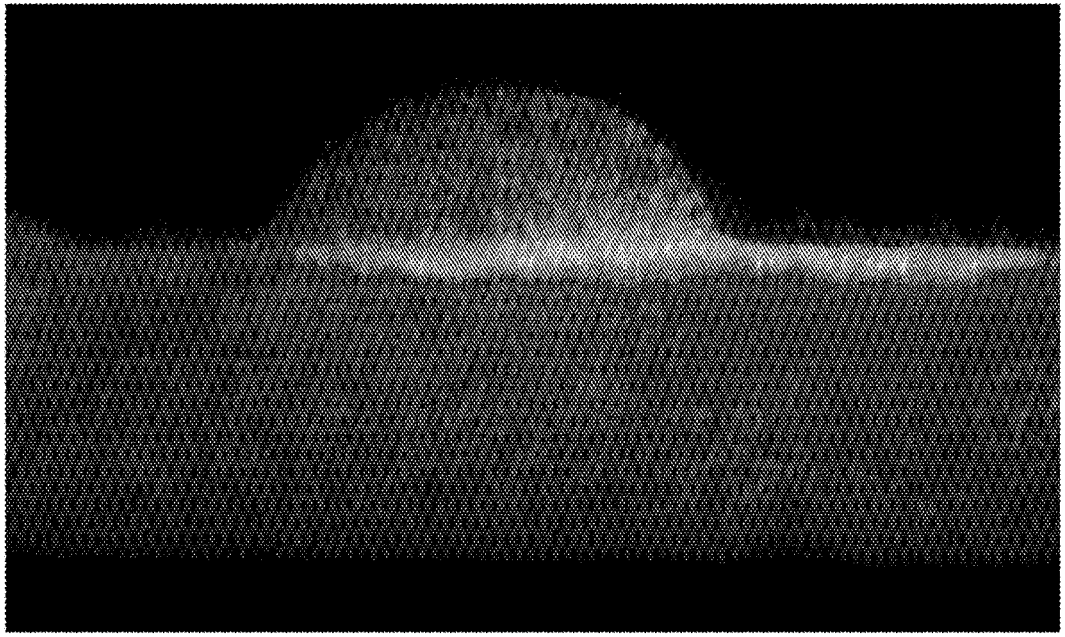

Referring to FIGS. 15A and 15B, microscopic images of boards produced without (FIG. 15A) and with (FIG. 15B) repellent treatment show that boards produced with a repellent treatment have adhesive beads which "stand up" on the surface. These results are consistent with enhanced retention of fluid, e.g., adhesive, on the surface when a repellent treatment is added to the surface prior to the addition of adhesive.

Example 4

A hot melt polyurethane was disposed on a scrim surface of an article comprising a fiber-reinforced thermoplastic core (polypropylene and glass fibers with an overall basis weight of about 1100 gsm) and a 20 gsm polyethyleneterephthalate scrim coated with a repellent. Adhesive was disposed at a rate of 17 grams per square foot.

Figures 16A, 16B:
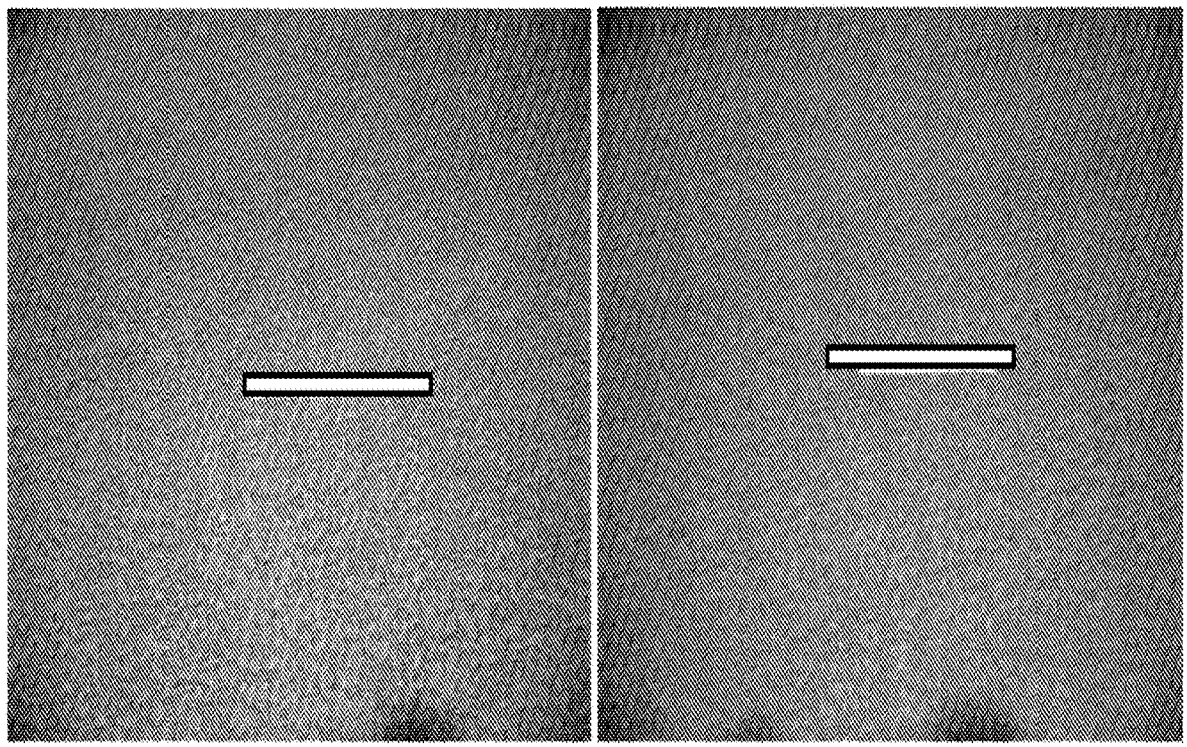
FIGS. 16A and 16B are photographs of boards treated with a repellent to demonstrate adhesive bead formation, in accordance with certain configurations.

As shown in FIGS. 16A and 16B, the polyurethane remained almost entirely on the surface of the repellent treated porous composite (FIG. 16B) and formed a plurality of liquid urethane beads across the span of the surface. The white bars present in FIGS. 16A and 16B mask an internal label used on the boards.

Figure 17A:
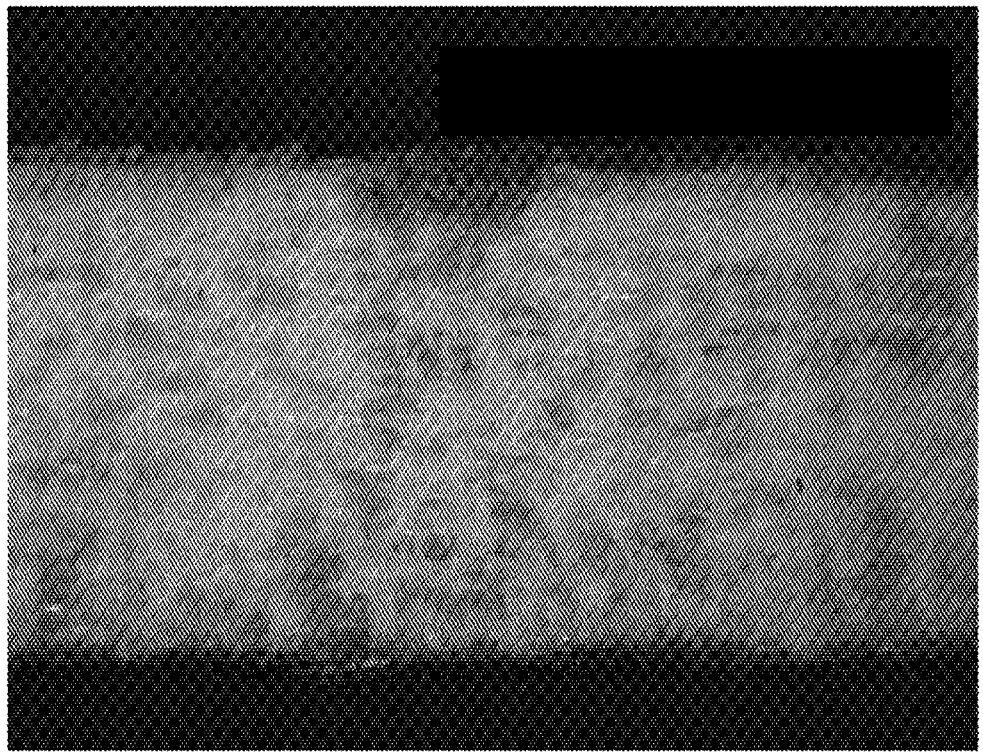
FIGS. 17A and 17B are microscope images of the boards of FIGS. 16A and 16B showing adhesive bead formation on repellent treated boards, in accordance with certain configurations.
Figure 17B:
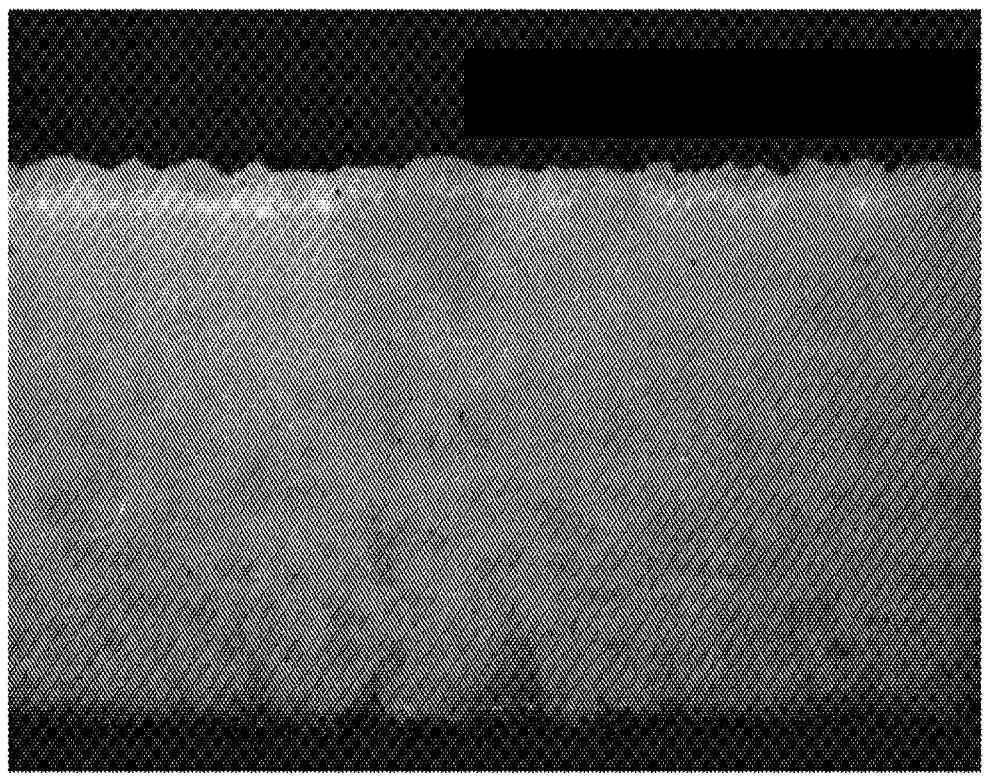

Referring to FIGS. 17A and 17B, microscopic images of boards produced without (FIG. 17A) and with repellent treatment (FIG. 17B) show that boards produced with a repellent treatment have a generally continuous layer across the top surface without any substantial absorption into the interior of the core. These results are consistent with enhanced retention of fluid, e.g., adhesive, on the surface when a repellent treatment is added to the surface prior to the addition of adhesive.

Example 5

Liquid urethane was disposed on a scrim surface of an article comprising a fiber-reinforced thermoplastic core (polypropylene and glass fibers with an overall basis weight of about 1100 gsm) and a 20 gsm polyethyleneterephthalate scrim coated with a repellent. Adhesive was disposed at a rate of 17 grams per square foot.

Figures 18A, 18B:
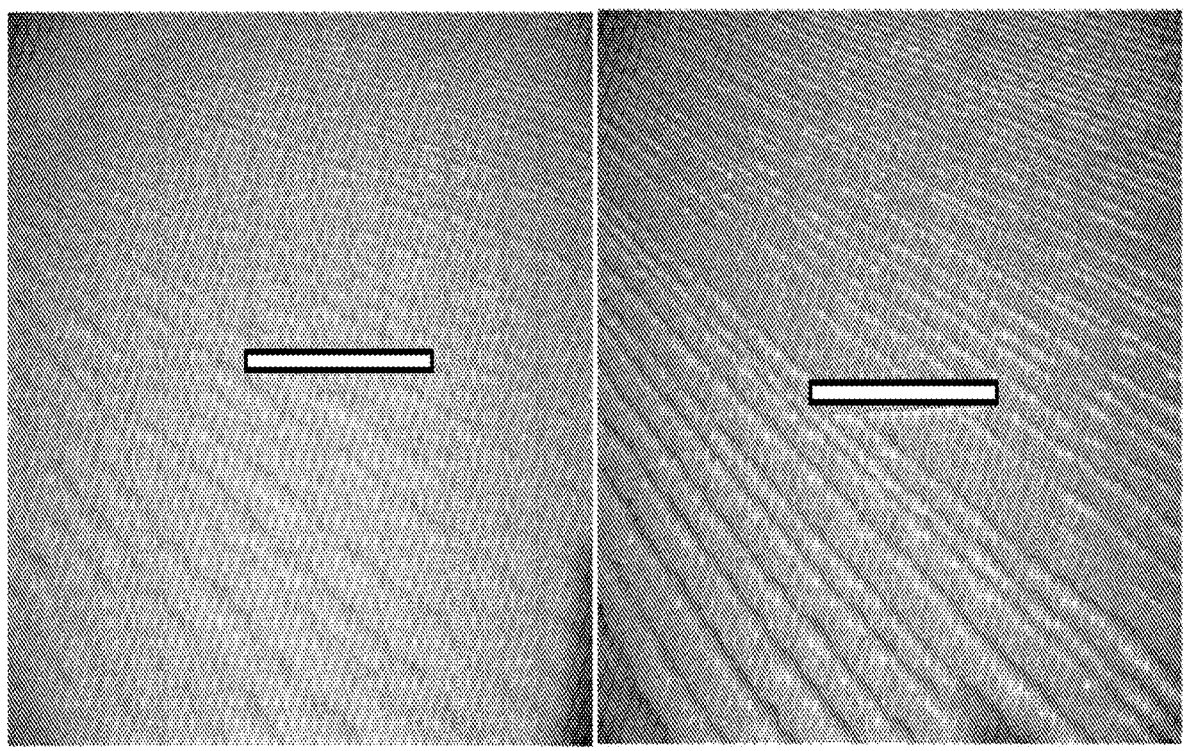
FIGS. 18A and 18B are photographs of boards treated with a repellent to demonstrate adhesive bead formation, in accordance with certain configurations.

As shown in FIGS. 18A and 18B, the liquid urethane remained almost entirely on the surface of the repellent treated porous composite (FIG. 18B) and formed a plurality of liquid urethane beads across the span of the surface. The white bars present in FIGS. 18A and 18B mask an internal label used on the boards.

Figure 19A:
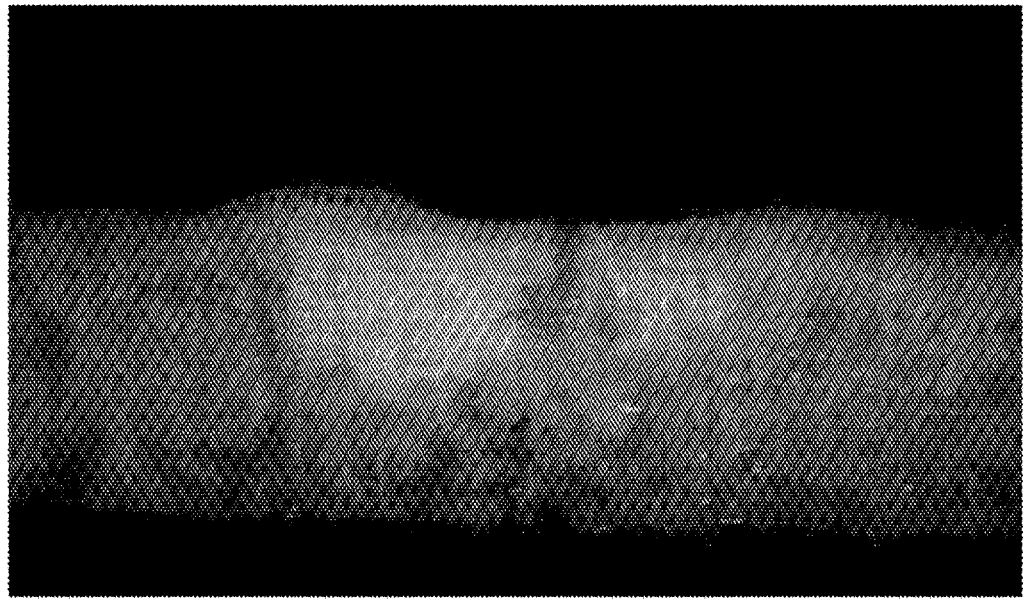
FIGS. 19A and 19B are microscope images of the boards of FIGS. 18A and 18B showing an adhesive coating on repellent treated boards, in accordance with certain configurations.
Figure 19B:
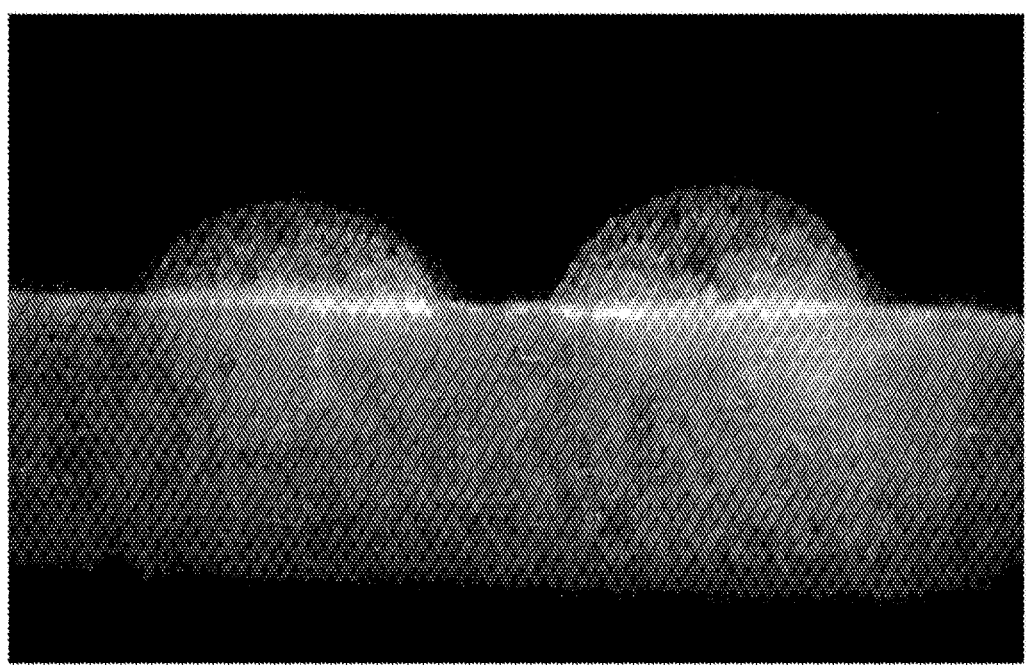

Referring to FIGS. 19A and 19B, microscopic images of boards produced without (FIG. 19A) and with (FIG. 19B) repellent treatment show that boards produced with a repellent treatment have adhesive beads which "stand up" on the surface. These results are consistent with enhanced retention of fluid, e.g., adhesive, on the surface when a repellent treatment is added to the surface prior to the addition of adhesive.

Example 6

Arboc liquid urethane was disposed on a scrim surface of an article comprising a fiber-reinforced thermoplastic core (polypropylene and glass fibers with an overall basis weight of about 1100 gsm) and a 20 gsm polyethyleneterephthalate scrim coated with a repellent. Adhesive was disposed at a rate of 17 grams per square foot.

Figure 20A:
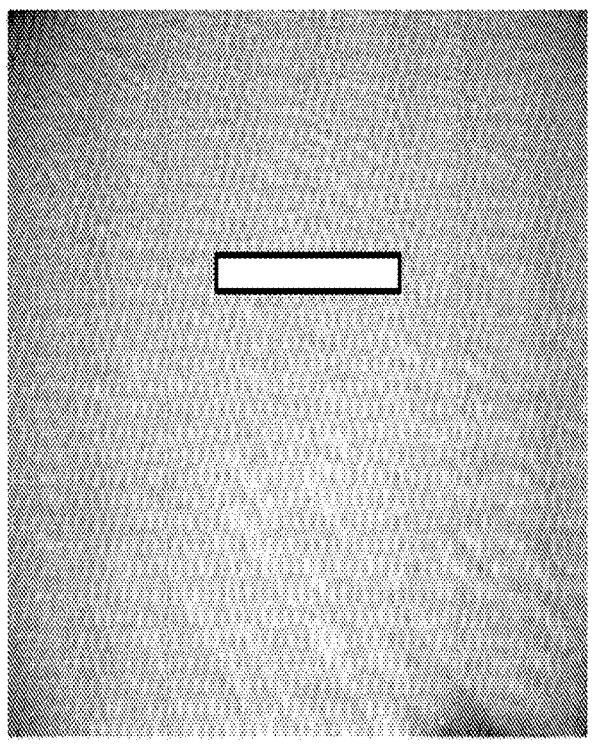
FIGS. 20A and 20B are photographs of boards treated with a repellent to demonstrate adhesive bead formation, in accordance with certain configurations.
Figure 20B:
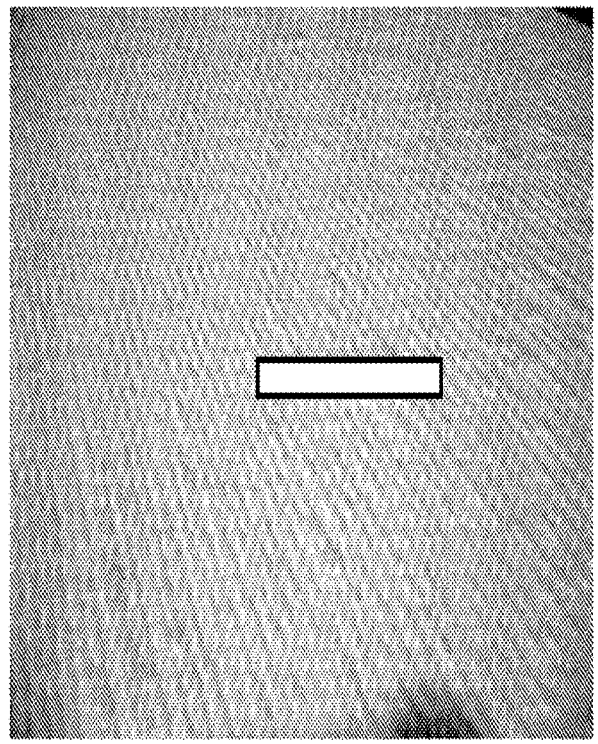

As shown in FIGS. 20A and 20B, the liquid urethane was partially absorbed into the board but a substantial amount remained on the surface of the repellent treated porous composite (FIG. 20B) and formed a plurality of liquid urethane beads across the span of the surface. The white bars present in FIGS. 20A and 20B mask an internal label used on the boards.

Figure 21A:
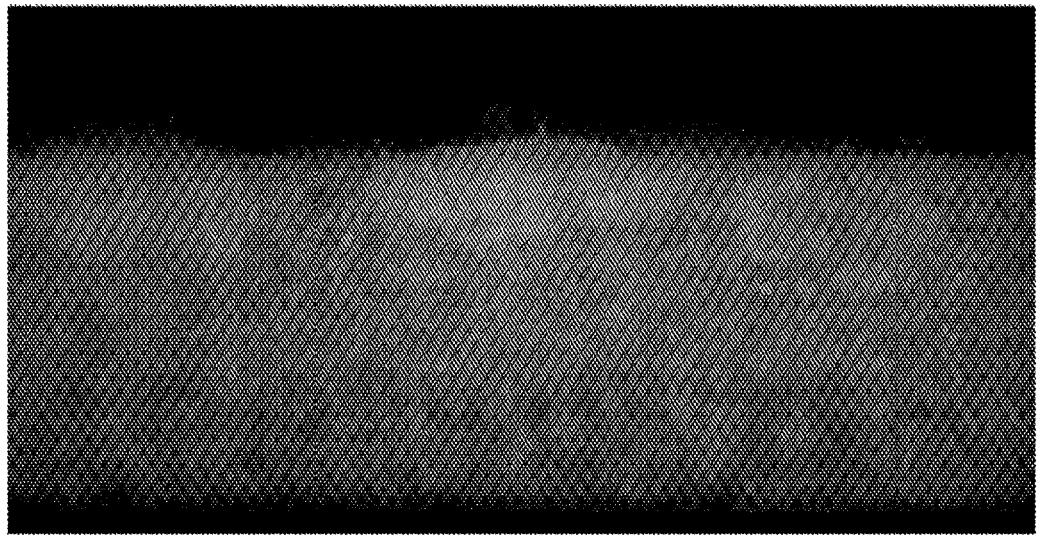
FIGS. 21A and 21B are microscope images of the boards of FIGS. 20A and 20B showing adhesive bead formation on repellent treated boards, in accordance with certain configurations.
Figure 21B:
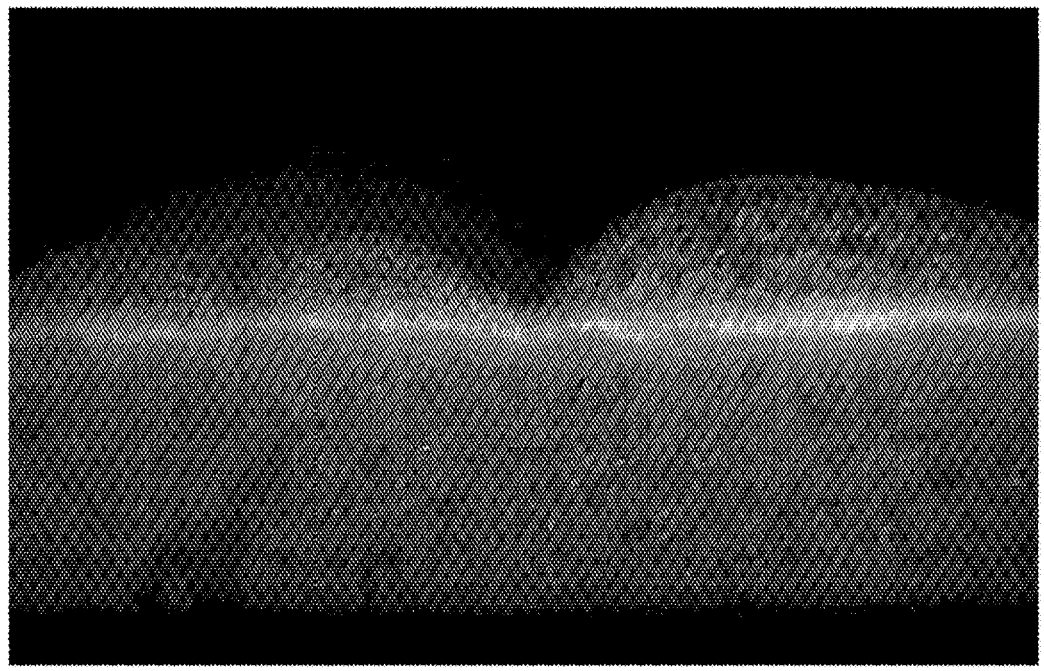

Referring to FIGS. 21A and 21B, microscopic images of boards produced without (FIG. 21A) and with (FIG. 21B) repellent treatment show that boards produced with a repellent treatment have adhesive beads which "stand up" on the surface, whereas the non-treated boards absorb almost all of the adhesive within the board interior. These results are consistent with enhanced retention of fluid, e.g., adhesive on the surface when a repellent treatment is added to the surface prior to the addition of adhesive.

Example 7

CFC liquid urethane was disposed on a scrim surface of an article comprising a fiber-reinforced thermoplastic core (polypropylene and glass fibers with an overall basis weight of about 1100 gsm) and a 20 gsm polyethyleneterephthalate scrim coated with a repellent. Adhesive was disposed at a rate of 17 grams per square foot.

Figure 22A:
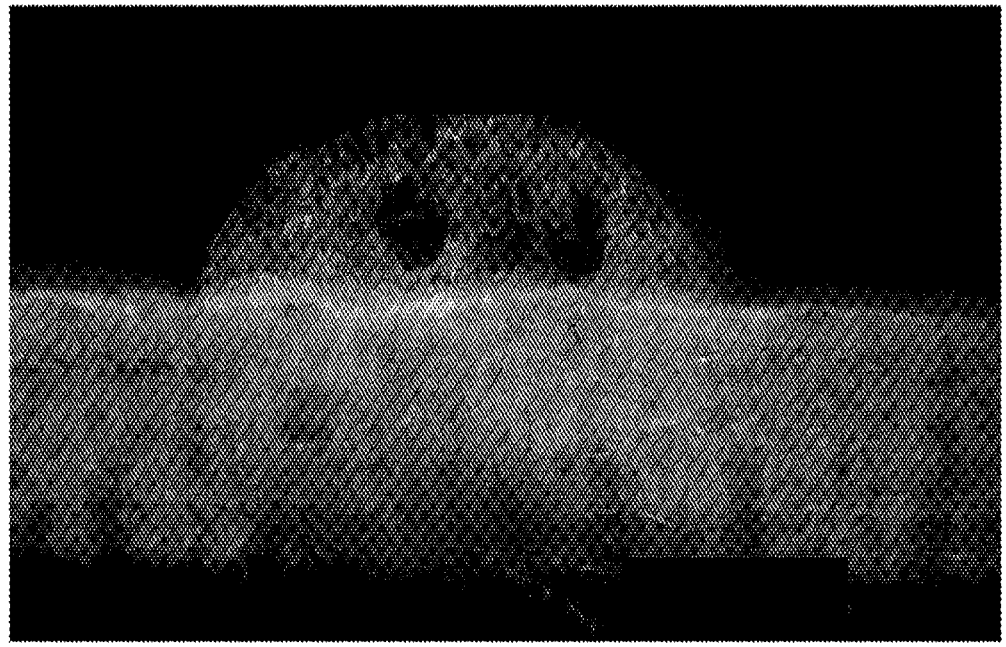
FIGS. 22A and 22B are microscope images showing free and constrained expansion of urethane coated boards, in accordance with certain configurations.
Figure 22B:
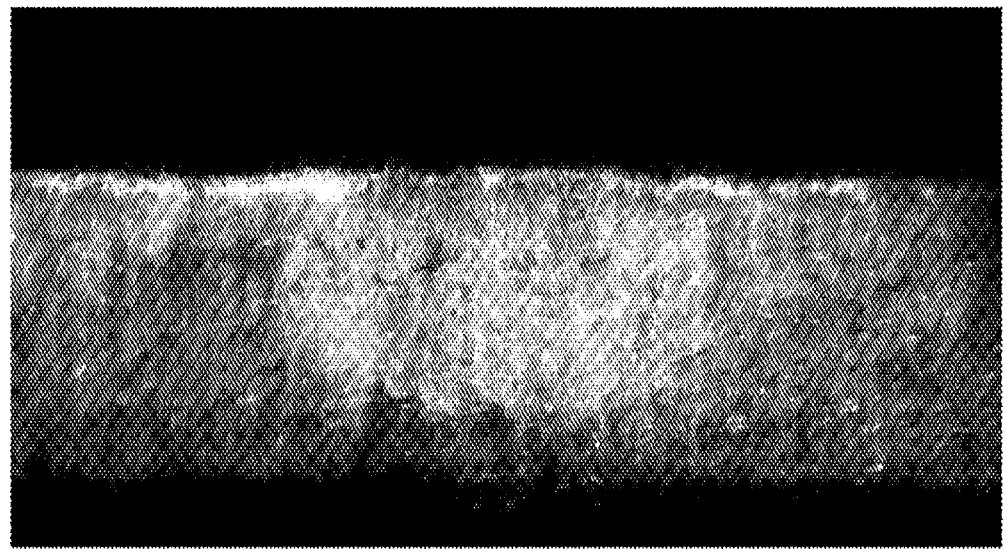

Referring to FIGS. 22A and 22B, microscopic images of boards produced with free expansion of the urethane adhesive (FIG. 22A) and constrained expansion of the urethane adhesive (FIG. 22B). Constrained expansions forces the adhesive into the interior of the board after promoting substantial spread of the adhesive across the glue interface.

When introducing elements of the examples disclosed herein, the articles "a," "an," "the" and "said" are intended to mean that there are one or more of the elements. The terms "comprising," "including" and "having" are intended to be open-ended and mean that there may be additional elements other than the listed elements. It will be recognized by the person of ordinary skill in the art, given the benefit of this disclosure, that various components of the examples can be interchanged or substituted with various components in other examples.

Although certain aspects, examples and embodiments have been described above, it will be recognized by the person of ordinary skill in the art, given the benefit of this disclosure, that additions, substitutions, modifications, and alterations of the disclosed illustrative aspects, examples and embodiments are possible.

The invention claimed is:

1. A method of reducing an amount of adhesive used to couple components of a composite article comprising a porous core layer and a substrate coupled to a surface of the porous core layer using a thermoplastic adhesive, the method comprising:
   pre-treating a surface of the substrate, prior to formation of the composite article, with a repellent material that is effective to decrease absorption of the thermoplastic adhesive into the substrate when the substrate is coupled to the porous core layer to retain at least 50% of the thermoplastic adhesive on the surface of the pre-treated substrate, wherein the porous core layer comprises a web of open celled structures defined by random crossing over of reinforcing materials held together by a thermoplastic material, wherein the surface of the substrate pre-treated with the repellent material comprises a repellency grade number of at least 3 as tested by ISO 23232 dated 2009, and wherein a porosity of the porous core layer is greater than 50%; and
   coupling the pre-treated substrate to the porous core layer through the thermoplastic adhesive between the pre-treated substrate and the porous core layer to form the composite article.

2. The method of claim 1, wherein the substrate is a scrim that is pre-treated with the repellent material.

3. The method of claim 2, further comprising disposing the thermoplastic adhesive on the pre-treated surface of the scrim prior to coupling the scrim to the porous core layer through the thermoplastic adhesive.

4. The method of claim 3, wherein the pre-treated surface of the scrim comprises adhesive beads after deposition of the thermoplastic adhesive on the pre-treated surface of the scrim.

5. The method of claim 2, wherein at least 90% of the thermoplastic adhesive is retained on the pre-treated scrim.

6. The method of claim 1, wherein the thermoplastic material of the porous core layer is polypropylene and the reinforcing materials of the porous core layer comprise glass fibers.

7. The method of claim 6, wherein the repellent material comprises a perfluoro material as the repellent material.

8. A method of reducing an amount of adhesive used to couple components of a composite article comprising a porous core layer and a scrim coupled to a surface of the porous core layer using a thermoplastic adhesive, the method comprising:
   pre-treating a surface of the scrim, prior to formation of the composite article, with a repellent material that is effective to decrease absorption of the thermoplastic adhesive into the scrim when the scrim is coupled to the porous core layer to retain at least 50% of the thermoplastic adhesive on the surface of the pre-treated scrim, wherein the porous core layer comprises a web of open celled structures defined by random crossing over of reinforcing materials held together by a thermoplastic material, wherein the surface of the scrim pre-treated with the repellent material comprises a repellency grade number of at least 3 as tested by ISO 23232 dated 2009, and wherein a porosity of the porous core layer is greater than 50%;
   disposing the thermoplastic adhesive on the pre-treated surface of the scrim prior to coupling the scrim to the porous core layer through the thermoplastic adhesive; and
   coupling the pre-treated scrim to the porous core layer through the disposed thermoplastic adhesive between the pre-treated substrate and the porous core layer to form the composite article.

9. The method of claim 8, in which the reinforcing materials comprise reinforcing fibers.

10. The method of claim 9, in which the reinforcing fibers are present from about 20 weight percent to about 80 weight percent based on the weight of the porous core layer.

11. The method of claim 9, in which the reinforcing fibers comprise metal fibers, metalized inorganic fibers, metallized synthetic fibers, glass fibers, carbon fibers, aramid fibers, ceramic fibers and combinations thereof.

12. The method of claim 8, in which the thermoplastic material comprises polyethylene, polypropylene, polystyrene, acrylonitrylstyrene, butadiene, polyethyleneterephthalate, polybutyleneterephthalate, polybutylenetetrachlorate, polyvinyl chloride, polyphenylene ether, polycarbonates, polyestercarbonates, thermoplastic polyesters, polyimides, polyamides, polyetherimides, acrylonitrile-butylacrylate-styrene polymers, amorphous nylon, polyarylene ether ketone, polyphenylene sulfide, polyaryl sulfone, polyether sulfone, poly(1,4phenylene) compounds, silicones and combinations thereof.

13. The method of claim 8, further comprising a flame retardant in the porous core layer or the substrate or both.

14. The method of claim 8, wherein the thermoplastic material of the porous core layer is polypropylene, the reinforcing materials of the core are glass fibers, the substrate is a scrim comprising the repellent material, and the thermoplastic adhesive comprises polyurethane.

15. The method of claim 14, wherein the scrim is a non-woven scrim.

16. The method of claim 15, wherein a basis weight of the scrim is 20 gsm or less.

17. A method of reducing an amount of adhesive used to couple components of a composite article comprising a porous core layer and a substrate coupled to a surface of the porous core layer using a thermoplastic adhesive, the method comprising:
   pre-treating a surface of the substrate, prior to formation of the composite article, with a repellent material that is effective to decrease absorption of the thermoplastic adhesive into the substrate when the substrate is coupled to the porous core layer to retain at least 50% of the thermoplastic adhesive on the surface of the pre-treated substrate, wherein the surface of the substrate pre-treated with the repellent material comprises a repellency grade number of at least 3 as tested by ISO 23232 dated 2009, wherein a porosity of the porous core layer is greater than 50%, and in which the substrate comprises a film, a frim, a foil, a woven fabric or a non-woven fabric; and coupling the pre-treated substrate to the porous core layer through the thermoplastic adhesive between the pre-treated substrate and the porous core layer to form the composite article.

* * * * *